United States Patent
Wetherbee et al.

(10) Patent No.: US 11,726,160 B2
(45) Date of Patent: *Aug. 15, 2023

(54) AUTOMATED CALIBRATION IN ELECTROMAGNETIC SCANNERS

(71) Applicant: ORACLE INTERNATIONAL CORPORATION, Redwood Shores, CA (US)

(72) Inventors: Edward R. Wetherbee, Omaha, NE (US); Andrew Lewis, Litchfield, NH (US); Michael Dayringer, Sunnyvale, CA (US); Guang C. Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,304

(22) Filed: Mar. 14, 2022

(65) Prior Publication Data
US 2022/0196776 A1  Jun. 23, 2022

Related U.S. Application Data

(63) Continuation of application No. 16/820,807, filed on Mar. 17, 2020, now Pat. No. 11,275,144.

(51) Int. Cl.
*G01R 35/00* (2006.01)
*G01R 29/08* (2006.01)

(52) U.S. Cl.
CPC ....... *G01R 35/005* (2013.01); *G01R 29/0814* (2013.01); *G01R 29/0892* (2013.01)

(58) Field of Classification Search
CPC .............. G01R 35/005; G01R 29/0892; G01R 29/0814; H04W 12/79; G01N 2021/3196
(Continued)

(56) References Cited

U.S. PATENT DOCUMENTS 3,705,516 A   12/1972 Reis
5,684,718 A   11/1997 Jenkins et al.
(Continued)

FOREIGN PATENT DOCUMENTS

CN   107181543 A  *  9/2017   ........... G01S 5/0252
CN   107181543 A1    9/2017
(Continued)

OTHER PUBLICATIONS

Translation of CN 107181543 (Year: 2017).*
(Continued)

*Primary Examiner* — Christopher P McAndrew
(74) *Attorney, Agent, or Firm* — Kraguljac Law Group, LLC

(57) ABSTRACT

Systems, methods, and other embodiments associated with automated calibration in electromagnetic scanners are described. In one embodiment, a method includes: detecting one or more peak frequency bands in electromagnetic signals collected by the electromagnetic scanner at a geographic location; comparing the one or more peak frequency bands to broadcast frequencies assigned to local radio stations of the geographic location; and indicating that the electromagnetic scanner is calibrated by finding at least one match between one peak frequency band of the peak frequency bands and one of the broadcast frequencies. An electromagnetic scanner may be recalibrated based on comparing the one or more peak frequency bands to broadcast frequencies.

20 Claims, 11 Drawing Sheets

(58) Field of Classification Search
USPC .......................................................... 324/601
See application file for complete search history.

(56) References Cited

U.S. PATENT DOCUMENTS

| | | |
|---|---|---|
| 7,020,802 B2 | 3/2006 | Gross et al. |
| 7,281,112 B1 | 10/2007 | Gross et al. |
| 7,613,576 B2 | 11/2009 | Gross et al. |
| 7,613,580 B2 | 11/2009 | Gross et al. |
| 7,702,485 B2 | 4/2010 | Gross et al. |
| 7,703,325 B2 | 4/2010 | Wu |
| 7,869,977 B2 | 1/2011 | Lewis et al. |
| 8,055,594 B2 | 11/2011 | Dhanekula et al. |
| 8,069,490 B2 | 11/2011 | Gross et al. |
| 8,200,991 B2 | 6/2012 | Vaidyanathan et al. |
| 8,275,738 B2 | 9/2012 | Gross et al. |
| 8,341,759 B2 | 12/2012 | Gross et al. |
| 8,457,913 B2 | 6/2013 | Zwinger et al. |
| 8,543,346 B2 | 9/2013 | Gross et al. |
| 9,933,338 B2 | 4/2018 | Noda et al. |
| 10,149,169 B1 | 12/2018 | Keller |
| 10,452,510 B2 | 10/2019 | Gross et al. |
| 10,496,084 B2 | 12/2019 | Li et al. |
| 11,055,396 B2 | 7/2021 | Gross et al. |
| 2008/0140362 A1 | 6/2008 | Gross et al. |
| 2008/0252309 A1 | 10/2008 | Gross et al. |
| 2008/0252441 A1 | 10/2008 | McElfresh et al. |
| 2008/0256398 A1 | 10/2008 | Gross et al. |
| 2009/0099830 A1 | 4/2009 | Gross et al. |
| 2009/0125467 A1 | 5/2009 | Dhanekula et al. |
| 2009/0306920 A1 | 12/2009 | Zwinger et al. |
| 2010/0023282 A1 | 1/2010 | Lewis et al. |
| 2010/0033386 A1 | 2/2010 | Lewis et al. |
| 2010/0161525 A1 | 6/2010 | Gross et al. |
| 2010/0305892 A1 | 12/2010 | Gross et al. |
| 2010/0306165 A1 | 12/2010 | Gross et al. |
| 2012/0030775 A1 | 2/2012 | Gross et al. |
| 2012/0111115 A1 | 5/2012 | Ume et al. |
| 2013/0157683 A1 | 6/2013 | Lymberopoulos et al. |
| 2014/0354300 A1* | 12/2014 | Ramachandran ...... A61B 6/547 324/654 |
| 2015/0137830 A1 | 5/2015 | Keller, III et al. |
| 2016/0097833 A1* | 4/2016 | Han .................. G01R 29/0878 343/702 |
| 2016/0098561 A1 | 4/2016 | Keller, III et al. |
| 2016/0258378 A1 | 9/2016 | Bizub et al. |
| 2017/0163669 A1 | 6/2017 | Brown et al. |
| 2017/0301207 A1 | 10/2017 | Davis et al. |
| 2018/0011130 A1 | 1/2018 | Aguayo Gonzalez et al. |
| 2018/0060203 A1* | 3/2018 | Gupta ................. G06F 11/3058 |
| 2018/0276044 A1 | 9/2018 | Fong et al. |
| 2018/0349797 A1 | 12/2018 | Garvey et al. |
| 2019/0064034 A1 | 2/2019 | Fayfield et al. |
| 2019/0102718 A1 | 4/2019 | Agrawal |
| 2019/0163719 A1 | 5/2019 | Gross et al. |
| 2019/0196892 A1 | 6/2019 | Matei et al. |
| 2019/0197045 A1 | 6/2019 | Kraljevic et al. |
| 2019/0197145 A1 | 6/2019 | Gross et al. |
| 2019/0237997 A1 | 8/2019 | Tsujii et al. |
| 2019/0243799 A1 | 8/2019 | Gross et al. |
| 2019/0286725 A1 | 9/2019 | Gawlick et al. |
| 2019/0378022 A1 | 12/2019 | Wang et al. |
| 2020/0144204 A1 | 5/2020 | Keller, III et al. |
| 2020/0191643 A1 | 6/2020 | Davis |
| 2020/0201950 A1 | 6/2020 | Wang et al. |
| 2020/0242471 A1 | 7/2020 | Busch |
| 2020/0387753 A1 | 12/2020 | Brill et al. |
| 2021/0081573 A1 | 3/2021 | Gross et al. |
| 2021/0158202 A1 | 5/2021 | Backlawski et al. |
| 2021/0174248 A1 | 6/2021 | Wetherbee et al. |
| 2021/0270884 A1 | 9/2021 | Wetherbee et al. |
| 2023/0054215 A1 | 2/2023 | Mishima et al. |

FOREIGN PATENT DOCUMENTS

| | | |
|---|---|---|
| CN | 110941020 A1 | 3/2020 |
| DE | 4447288 B4 | 7/1995 |
| DE | 60017609 T2 | 10/2005 |
| DE | 102018207176 A1 | 11/2019 |
| KR | 20210082971 A | 7/2021 |
| WO | 2017187333 A1 | 11/2017 |
| WO | 2020215116 A1 | 10/2020 |
| WO | 2021166128 A1 | 8/2021 |

OTHER PUBLICATIONS

Deepika et al., Design & development of location identification using RFID with Wi-Fi positioning systems, 2017 Ninth Intl. Conference on Ubiquitous and Future Networks (ICUFN). IEEE, 2017) (6 pgs).
United States Patent and Trademark Office, Non-Final Office Action issued in U.S. Appl. No. 16/820,807 dated May 21, 2021 (36 pgs).
United States Patent and Trademark Office, Non-Final Office Action issued in U.S. Appl. No. 16/804,531 dated Jul. 20, 2021 (51 pgs).
Michael Kan; Does Your Motherboard Have a Secret Chinese Spy Chip?; Oct. 5, 2018, pp. 1-9, downloaded on Sep. 3, 2021 from: https://www.pcmag.com/news/does-your-motherboard-have-a-secret-chinese-spy-chip.
Wikipedia; Polarizability; pp. 1-4; downloaded on Sep. 3, 2021 from: https://en.wikipedia.org/w/index.php?title=Polarizability&oldid=1024366656.
Kenny Gross, Oracle Labs; MSET2 Overview: "Anomaly Detection and Prediction" Oracle Cloud Autonomous Prognostics; p. 1-58; Aug. 8, 2019.
U.S. Nuclear Regulatory Commission: "Technical Review of On-Lin Monitoring Techniques for Performance Assessment vol. 1: State-of-the Art", XP055744715, Jan. 31, 2006, pp. 1-132.
Gribok, et al,. "Use of Kernel Based Techniques for Sensor Validation in Nuclear Power Plants," International Topical Meeting on Nuclear Plant Instrumentation, Controls, and Human-Machine Interface Technologies (NPIC & HMIT 2000), Washington, DC, Nov. 2000, pp. 1-15.
Gross, K. C. et al., "Application of a Model-Based Fault Detection System to Nuclear Plant Signals," downloaded from https://www.researchgate.net/publication/236463759; Conference Paper: May 1, 1997, 5 pages.
Singer, et al., "Model-Based Nuclear Power Plant Monitoring and Fault Detection: Theoretical Foundations," Intelligent System Application to Power Systems (ISAP '97), Jul. 6-10, 1997, Seoul, Korea pp. 60-65.
Patent Cooperation Treaty (PCT), International Search Report and Written Opinion issued in PCT International Application No. PCT/US2021/062380 dated May 24, 2022 (10 pgs).
Patent Cooperation Treaty (PCT), International Search Report and Written Opinion issued in PCT International Application No. PCT/US2020/060083 dated Mar. 19, 2021 (13 pgs).
Patent Cooperation Treaty (PCT), International Search Report and Written Opinion issued in PCT International Application No. PCT/US2021/015802 dated May 28, 2021 (13 pgs).
Patent Cooperation Treaty (PCT), International Search Report and Written Opinion issued in PCT International Application No. PCT/US2021/013633 dated May 6, 2021 (10 pgs).
Patent Cooperation Treaty (PCT), International Search Report and Written Opinion issued in PCT International Application No. PCT/US2021/014106 dated Apr. 26, 2021 (9 pgs).
Dickey et al.; Checking for Autocorrelation in Regression Residuals; pp. 959-965; Proceedings of 11th Annual SAS Users Group International Conference; 1986.
Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.
Whisnant et al; "Proactive Fault Monitoring in Enterprise Servers", 2005 IEEE International Multiconference in Computer Science & Computer Engineering, Las Vegas, NV, Jun. 27-30, 2005.

(56) References Cited

OTHER PUBLICATIONS

Garcia-Martin Eva et al., "Estimation of Energy Consumption in Machine Learning," Journal of Parallel and Distributed Computing, Elsevier, Amsterdam, NL, vol. 134, Aug. 21, 2019 (Aug. 21, 2019), pp. 77-88.
Huang H, et al. "Electronic counterfeit detection based on the measurement of electromagnetic fingerprint", Microelectronics Reliability: An Internat . Journal & World Abstracting Service, vol. 55, No. 9, Jul. 9, 2015 (Jul. 9, 2015) pp. 2050-2054.
Bouali Fatma et al. "Visual mining of time series using a tubular visualization", Visual Computer, Springer, Berlin, DE, vol. 32, No. 1, Dec. 5, 2014 (Dec. 5, 2014), pp. 15-30.
Gou, Yuhua, Implementation of 3d Kiviat Diagrams. (2008). (Year: 2008).
Abran et al.; Estimation Models Based on Functional Profiles. Intl. Workshop on Software Measurement-IWSM/MetriKon, Kronisburg (Germany), Shaker Verlag. 2004 (Year: 2004).
Wang, Ray C., et al., Process Fault Detection Using Time-Explicit Kiviat Diagrams. AlChE Journal 61.12 (2015): 4277-4293.
Patent Cooperation Treaty (PCT) International Search Report and Written Opinion of the International Searching Authority in PCT International Application No. PCT/US2021/015359, International filing date Jan. 28, 2021 (Jan. 28, 2021), dated Apr. 9, 2021 (Apr. 9, 2021), 34 pgs.
Ray; Frequency Calibration for SDRs Without GPS, pp. 1-9, Feb. 15, 2018; downloaded from: https://www.amsat.org/wordpress/wp-content/uploads/2018/02/2017Symposium-SDR-Freq-Calibration.pdf.
Mishima et al., Abnormality Estimation Apparatus, Abnormality Estimation Method, and Computer-Readable Recording Medium, machine translation of WO 2021166128 A1.
Wang et al., Machine Condition Monitoring and Fault Prediction System, machine translation of DE 4447288 A1.
Im et al., Method and Apparatus for Performing Vibration Shake Test of Satellites, machine translation of KR 20210082971 A.
Diamond et al., A Method and System for Monitoring Rotor Blades of a Turbomachine Using Blade Tip Timing (BTT), machine translation of WO 2017187333 A1.
Lafleur et al., Arrangement and Method for Vibration Testing with Acoustic Waves, machine translation of DE 60017609 T2.
Grasreiner et al., Method and Control Unit for Detecting Rough Running of a Drive, machine translation of DE 102018207176 A1.
Yesilli et al., On Transfer Learning for Chatter Detection in Turning Using Wavelet Packet Transform and Ensemble Empirical Mode Decomposition, CIRP Journal of Manufacturing Science and Technology 28 (2020) 118-135.

\* cited by examiner

AUTOMATED CALIBRATION IN ELECTROMAGNETIC SCANNERS

CROSS REFERENCE TO RELATED APPLICATION

This disclosure is a continuation of and claims the benefit of priority to U.S. patent application Ser. No. 16/820,807, entitled "Automated Calibration of EMI Fingerprint Scanning Instrumentation for Utility Power System Counterfeit Detection," filed Mar. 17, 2020, which is incorporated herein by reference in its entirety for all purposes.

BACKGROUND

It has been estimated that counterfeit electronic components in international supply chains cost $220 billion per year across all industries that use electronics (including the information technology, medical, military, gaming, transportation, and utility sectors). Counterfeit systems (or systems that contain counterfeit components) often appear so real that service engineers cannot distinguish them from authentic systems by simple visual inspection. However, the counterfeit systems often contain scrap components from discarded systems, cheaply manufactured components, or older components from recycled vintage systems, which are repackaged to resemble authentic systems.

Counterfeit systems or systems containing counterfeit components ("counterfeit systems") are then integrated into the supply chain via brokerage channels. When the counterfeit systems are shipped to customers, they often fail on arrival or within a very short time period causing large warranty losses, shortened mean time between failures, and customer dissatisfaction. In some situations, the counterfeit systems even include "spy chips" or "mod chips" which can grant unauthorized access to or control over the counterfeit system, presenting a significant risk to infrastructure. In the utility sector, the use of counterfeit electronic components is more than a costly nuisance—it is a major safety concern. Failure of utility components can cause life-threatening situations such as blackouts and fires.

The North American Electric Reliability Corporation, (NERC, a North American utility regulator) and the United States Federal Energy Reliability Commission (FERC) have issued a supply chain risk management regulation (No. CIP-013-1) to reduce risks to the reliable operation of the bulk electrical system. The regulation requires that by July 2020 all utilities on the North American continent must implement technology to detect counterfeit components for all power system assets used in generating facilities, supervisory control and data acquisition (SCADA) subsystems, and distribution-grid assets.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
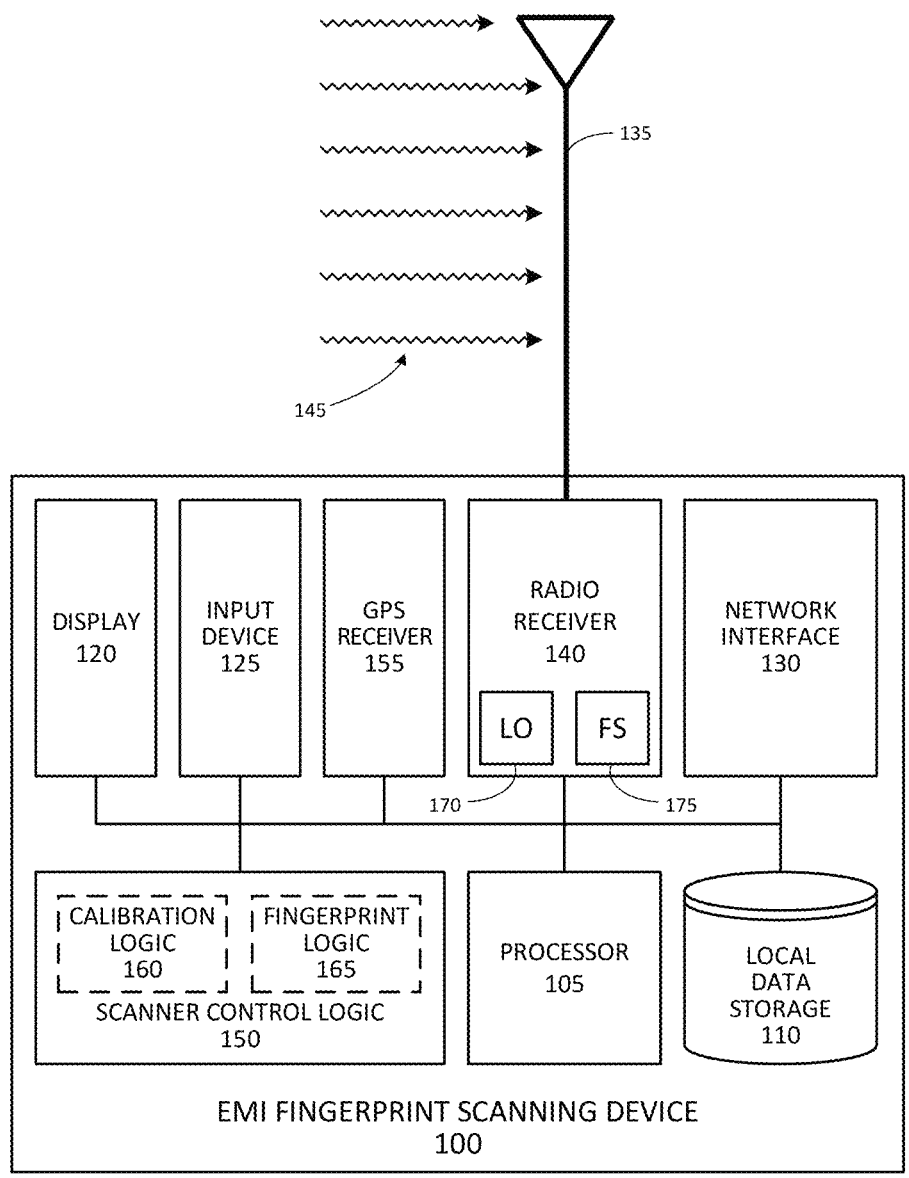
FIG. 1 illustrates one embodiment of an EMI fingerprint scanning device associated with automated calibration of EMI fingerprint scanning instrumentation for utility power system counterfeit detection.

Systems and methods are described herein that provide automated calibration in electromagnetic scanners. One example application for such automated verification of calibration in electromagnetic scanners is for automated calibration of electromagnetic interference (EMI) fingerprint scanning instrumentation for utility power system counterfeit detection. Explanation of automated calibration in electromagnetic scanners is described herein with reference to EMI fingerprint scanning instrumentation, but the scope of this application is not limited to EMI fingerprint scanning instrumentation. A power utility device can be non-invasively determined to be made entirely of authentic components, or partially or entirely made of counterfeit components by scanning EMI signals generated by the power utility device. But, systems for detecting electromagnetic signals may drift out of calibration, which will affect the accuracy of the counterfeit determination.

EMI signals are generated by power utility devices such as transformers, generators, inverters, meters, relays, or other electrical grid systems during operation. These EMI signals are commonly regarded as noise, but these EMI signals can also carry information that can be used to generate unique EMI fingerprints for the utility device. For example, the EMI given off by a target utility device with an unknown configuration of components can be scanned to generate a target EMI fingerprint for the target utility device. The generated target EMI fingerprint can be compared with reference EMI fingerprints of reference utility devices of known configurations to confirm that the target utility device is of a known make, model, and configuration, or notify that the target utility device is not of a known make, model, and configuration and therefore may contain one or more suspected counterfeit components, or may be suspected to be entirely counterfeit. (For convenience, utility devices containing one or more counterfeit components may be referred to as "counterfeit" herein, even though the device may include many genuine components.)

This technique of counterfeit detection is "passive" because it does not involve disassembling the power system electronics of a target utility device to perform internal inspections, such as visual or photographic inspections. Note that counterfeit detection techniques that involve disassembly are ineffective and often cause subsequent problems in the inspected utility device, even if they do not detect any counterfeit components. In contrast, this passive technique makes it practical to periodically inspect power system devices (i) at checkpoints in the supply chain, (ii) at ports of entry/egress where components or assembled/integrated systems are transported across national boundaries, or (iii) when systems are received by a utility customer as part of initial setup preparation and during power-on-self-test (POST) operations conducted before deployment in the grid or generating facilities. Hence, this new technique helps to ensure that no counterfeit components or "spy chips" or "mod chips" are installed in power system electronics between component manufacturing and the "assembly plant," or in transit between the assembly plant and the utility system. Moreover, this new technique requires no hardware modifications in utility power systems, and is therefore backward-compatible with legacy power systems, which are commonly used by utilities.

To further enhance the utility of EMI fingerprint counterfeit detection, embodiments present the user with a simple "all-clear" decision that indicates a target device being scanned contains no counterfeit components and is genuine or authentic, or else generates an alarm, alert, or warning that the target device being scanned is suspected to be counterfeit in whole or in part. This makes the scanning procedure usable by non-expert personnel who can understand the results without training in EMI radiation science, data science, machine learning, or counterfeit detection techniques. The scanning procedure enables the detection and identification of exact counterfeits in an autonomous fashion so that personnel (i) involved in utility acceptance testing of components from the supply chain, and (ii) involved in examining shipped systems at ports of entry and other national and international boundaries can quickly identify utility devices that contain internal counterfeit components, or certify utility devices as having all authentic components.

In one embodiment, EMI fingerprint scanning instrumentation (also referred to herein as an EMI fingerprint scanning device or an electromagnetic scanner) is configured to perform the scan of a target utility device. But, calibration may need to be done before and/or after (in other words, roughly contemporaneously with) every critical analysis because instrumentation can drift out of calibration. In particular, the components of the EMI fingerprint scanning device that are used for detection of EMI are susceptible to drift out of calibration, due to time, temperature, or a wide variety of other factors. Improper calibration of the EMI fingerprint scanning device may cause false alerts (Type-I Errors) or missed alerts (Type-II Errors) as to whether a target device is counterfeit.

In each case, the error is costly. For example, when a target device is detected as a suspected counterfeit containing one or more counterfeit components, the device may be set aside for later disassembly and detailed internal inspection and testing by more highly trained personnel. The disassembly, inspection, and testing can damage the target device, or cause subsequent performance problems for the device. Thus, for a Type-I, false positive detection of a target device as containing one or more counterfeit components, resources are wasted on internal inspection, and the target device itself is at risk of damage. For a Type-II, missed detection of a target device as containing one or more counterfeit components, the counterfeit device may be placed into service, putting the power grid or other system where the counterfeit device is installed at greater risk of failure. It is therefore very important to ensure that the EMI fingerprint scanning instrumentation is in correct calibration before every scan or sequence of scans, especially when the goal of the scans is "In Compliance" vs. "Out of Compliance" evaluations.

Just as the counterfeit scanning procedure is simplified to be made usable by non-expert personnel, the systems and methods described herein provide an automated calibration procedure that requires little attention or interaction from humans, and requires a minimum of training for the personnel conducting the scans. The systems and methods described herein present a totally autonomous calibration procedure that enables lay-person personnel to autonomously have fully calibrated EMI fingerprint scans every time, with minimal additional effort or training required for the personnel conducting the scans. The calibration procedure ensures that the frequencies, amplitudes, and gain for the radio frequency detection instrumentation of the EMI fingerprint scanning device has not drifted out of calibration before new scans are conducted.

Calibration ordinarily requires access to a bulky and expensive reference source. The systems and methods described herein eliminate that requirement. In one embodiment, systems and methods described herein leverage the ubiquitous public AM (amplitude modulation) and FM (frequency modulation) radio signals, in combination with publicly available information from frequency data services such as the databases maintained by the United States Federal Communications Commission (FCC) to synthesize a reference source. The FCC databases accessible through FCC.gov (and other frequency data services) offer the capability to submit a geographic location in a search to retrieve the nearest AM and FM radio stations, along with their assigned broadcast frequencies. Thus, the EMI fingerprint scanning device can include a software application, software module, or other logic configured to query the frequency data service with the current location of the EMI fingerprint scanning device and receive a formatted list of the local AM and FM radio stations and their fixed broadcast frequencies. The EMI fingerprint scanning device can then select a subset of those fixed frequencies, for example a "top 10" list (by proximity, or by broadcast power), to serve as reference sources. The EMI fingerprint scanning device can evaluate these known, fixed reference sources against electromagnetic signals detected by the EMI fingerprint scanning device for EMI fingerprint instrumentation autonomous calibration validation. This results in a robust, straightforward, and reliable process for calibration.

Thus, no additional equipment is required for calibration of the EMI fingerprint scanning device. Also, no special skills or knowledge are required for the operator of the EMI fingerprint scanning device to perform the calibration. The participation of the operator is minimized in the calibration process.

Further, mobile devices now commonly have the capability to detect location using built-in, low-cost global positioning system (GPS) receiver chips. In one embodiment, the EMI fingerprint scanning device incorporates the same GPS chips for detecting the location of the EMI fingerprint scanning device, enabling the EMI fingerprint scanning device to detect and send its own location to the frequency data service without requiring that a user provide the location information. Thus, the participation of the operator of the EMI fingerprint scanning device can be virtually eliminated from the calibration process.

Example EMI Fingerprint Scanning Device

FIG. 1 illustrates one embodiment of an EMI fingerprint scanning device 100 associated with automated calibration of EMI fingerprint scanning instrumentation for utility power system counterfeit detection. The EMI fingerprint scanning device 100 may be used for sensing EMI emissions of target utility device and comparing an EMI fingerprint based on the sensed EMI emissions with a reference EMI fingerprint from a certified authentic reference utility device. In one embodiment, EMI fingerprint scanning device 100 includes a processor 105, local data storage 110, display 120, input device 125, network interface 130, antenna 135 and radio receiver 140 for sensing electromagnetic signals 145, scanner control logic 150, and GPS receiver 155, each operably interconnected for example by one or more busses.

In one embodiment, processor 105 configured to execute one or more steps of methods described herein. Processor 105 may be, for example, a central processing unit (CPU), graphics processing unit (GPU), controller, mobile device processor, or special purpose processor associated with EMI fingerprint scanning device 100.

In one embodiment, the local data storage 110 may include volatile and/or non-volatile memory hardware installed in the EMI fingerprint scanning device 100. The memory hardware may be operated by storage management software executed by processor 105. The local data storage 110 stores information collected or generated by other components in the memory hardware using one or more data structures.

In one embodiment, display 120 may include a display device such as an LED or LCD display and associated graphics hardware for managing the display device. Display 120 may be configured to present a graphical user interface (GUI). In one embodiment, input device 125 may include one or more input devices, including a cursor controller, touch screen integrated with display 120, hardware keyboard or keypad, software keyboard or keypad, microphone and audio processing with voice-to-text software, and/or configurable or dedicated special purpose buttons.

In one embodiment, network interface 130 may be a wireless network interface device such as an ethernet or Bluetooth transceiver. In one embodiment, the network interface 130 is configured to enable the EMI fingerprint scanning device 100 to communicate with other computing devices over a computing network.

In one embodiment, antenna 135 is configured to sense electromagnetic signals 145 and apply the sensed signals to radio receiver 140 that is coupled to antenna 135. Depending on the configuration of antenna 135 and radio receiver 140, the EMI signals are sensed across a broad spectrum of frequencies, for example from approximately 500 kilohertz up to approximately 4 gigahertz. Other ranges may also be appropriate, and the range of frequencies available to the EMI fingerprint counterfeit scanner 100 may be governed by the combination of antenna 135 and radio receiver 140. In general, the range of frequencies sensed by the combination of antenna 135 and radio receiver 140 should include a range of frequencies encompassing some or all of electromagnetic frequencies assigned to broadcast AM radio, broadcast FM radio, or broadcast television.

In one embodiment, antenna 135 may include: a dipole antenna, a Yagi-Uda antenna, a loop antenna, an electrical short antenna (e.g., an open-ended wire having a length less than a quarter wavelength), a fractal antenna, a parabolic antenna, a microstrip antenna, a quad antenna, a random wire antenna (e.g., an open-ended wire having a length greater than one wavelength), a beverage antenna, a helical antenna, a phased array antenna, and any other type of antenna now known or later developed. In one simple and inexpensive embodiment, antenna 135 may be an insulated wire with a fixed length of the insulation stripped off. In one embodiment, the type and length of the antenna can be selected to achieve optimal discrimination sensitivity and robustness.

In one embodiment, radio receiver 140 is a software defined radio receiver or transceiver. Radio receiver 140 may include a local oscillator 170 (such as a crystal oscillator), a frequency synthesizer 175 (such as a phase locked loop frequency synthesizer), and other radio front end components. Note that the frequency signals generated by the frequency synthesizer 175 are multiples of a stable frequency generated by the local oscillator 170. Crystal oscillators generate a highly stable frequency, but time (age of the crystal), temperature, humidity, operating voltage, or other factors can cause the frequency generated by the crystal oscillator to drift away from the desired frequency. Because the synthesized frequencies are multiples of the frequency generated by the local oscillator 170, this drift causes the EMI fingerprint scanning device 100 to sense the electromagnetic spectrum at incorrect frequencies. Other factors may also contribute to the drift.

In one embodiment, scanner control logic is a logic component specially configured with instructions to execute calibration logic 160, and/or fingerprint logic 165. In one embodiment, scanner control logic 160 is an EPROM or similar special purpose logic chip. In one embodiment, the scanner control logic 160 is a processor, such as processor 105, configured with the instructions to execute calibration logic 160, and/or fingerprint logic 165. Calibration logic 160 includes instructions to execute one or more of the steps of methods described herein associated with automated calibration of EMI fingerprint scanning instrumentation. Fingerprint logic 165 includes instructions to execute one or more of the steps of methods described herein associated with detection and identification of counterfeit components in utility power systems.

In one embodiment, GPS receiver 155 is a global positioning system (GPS) (or other satellite radio navigation system such as Galileo, GLONASS, or BeiDou) receiver chip configured to sense electromagnetic time signals from navigation satellites, and to calculate longitude, latitude, and elevation from the sensed signals.

Figure 2:
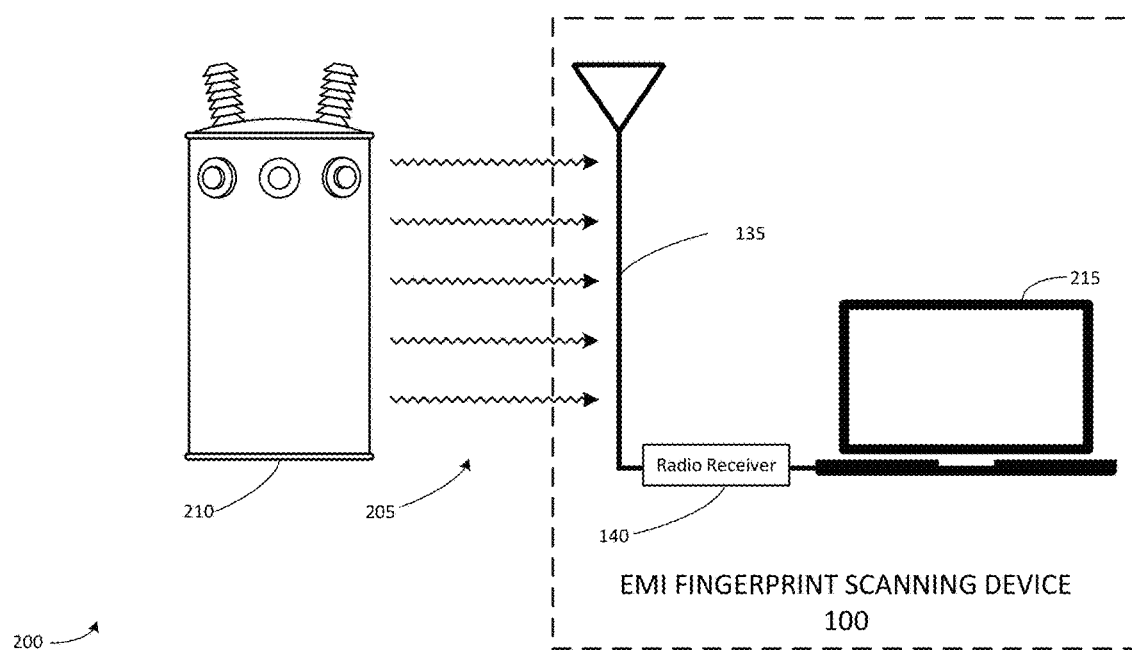
FIG. 2 illustrates one embodiment of an EMI fingerprint scanning device associated with automated calibration of EMI fingerprint scanning instrumentation in an environment where the EMI fingerprint scanning device is used to detect EMI signals from a target utility device.

FIG. 2 illustrates one embodiment of an EMI fingerprint scanning device 100 associated with automated calibration of EMI fingerprint scanning instrumentation in an environment 200 where the EMI fingerprint scanning device 100 is used to detect EMI signals 205 from a target utility device 210. In one embodiment, the EMI fingerprint scanning device 110 is a mobile device (not shown) or computer 215 coupled with a radio receiver 140 and antenna 135. In one embodiment, EMI fingerprint scanning device 100 is a special purpose unit including the radio receiver. In one embodiment, the EMI fingerprint scans are taken with a hand-held wand, or a mag-mount miniature device that comprises an antenna and a software defined radio (SDR), or an insertable device combination of antenna and SDR.

The detection of EMI signals 205 from target utility device 210 may be referred to herein as a "scan" of the target utility device 210. To scan the target utility device 210, Antenna 135 can be positioned either in close proximity to the target utility device 210, or further away from the target utility device 210. To achieve better sensitivity in antenna 135 and hence higher signal-to-noise ratio (SNR) in EMI fingerprint counterfeit scanner 100, a smaller distance between the target utility device 210 and antenna 135 is preferred. In addition to distance, the sensitivity of antenna 135 can also be affected by its orientation with respect to the target utility device 210.

In one embodiment, antenna 135 is positioned at a predetermined distance and orientation with respect to target utility device 210 during a scan. This predetermined distance and orientation may be the same distance and orientation used to detect reference EMI signals from a reference utility device of the same make and model as the target utility device 210. The consistency of antenna placement with respect to the utility devices being scanned can increase the ability of the EMI fingerprint counterfeit scanner 100 to match target EMI fingerprints with reference EMI fingerprints, and distinguish target EMI fingerprints from reference EMI fingerprints.

In one embodiment, the antenna 135 may be affixed to the EMI fingerprint counterfeit scanner 100. In one embodiment, the antenna 135 may be in a fixed position (distance and orientation) with respect to the target utility device 210 during a scan of the target utility device 210 by the EMI fingerprint counterfeit scanner 100. For example, the antenna 135 may be placed in a location proximate to the target utility device 210 and not moved during the scan. The antenna 135 may be affixed to a housing of the target utility device 210, or may be affixed within the housing of target utility device 210. The antenna 135 may be affixed mechanically, such as with a bolt, screw, or clip, magnetically, or with adhesive, such as sensor wax. In one embodiment, multiple antennas and/or radios (not shown) may be positioned at different locations and orientations with respect to the target utility device 210 during the scan, and the measurements taken from the multiple antennas and/or radios may be merged. In one embodiment, antenna 135 is moved to multiple different locations and orientations with respect to the target utility device 210 over the course of the scan. Implementations of these various antenna positions and configurations, as well as other positions and configurations, may be selected as desirable to improve signal-to-noise ratio (SNR) of the detected EMI signals for the overall target utility device 210, or to emphasize EMI signals emitted by specific components the target utility device 210.

In one embodiment, radio receiver 140 receives the EMI signals sensed by antenna 135 and fingerprint logic 165 is configured to convert the received EMI signals from analog signals to digital signals, and record the power amplitude and frequency of the signals at defined time intervals. In one embodiment, fingerprint logic 165 is configured to store the recorded signals as a data structure in local data storage 110 and/or compare them with a reference EMI fingerprint. In one embodiment, the signals are stored as tuples of time, frequency, and power amplitude values (t, f, p). In one embodiment, the signals are stored in a flat file data set that has columns for the frequencies and rows for the observations (time), and the power amplitude values at each row-column entry. In one embodiment, the system converts the target EMI signals from a time domain to a frequency domain, for example by performing a fast Fourier transform (FFT) or other appropriate transform on the collected target EMI signals. In one embodiment, the observation rate may be one observation per second, although higher and lower rates may be selected based on the pace of transitions in the test sequence. In one embodiment, the EMI signals across the full range of frequencies sensed by the antenna 115 and radio 120, such as the range from approximately 500 kilohertz through approximately 4 gigahertz, are stored.

Figure 3:
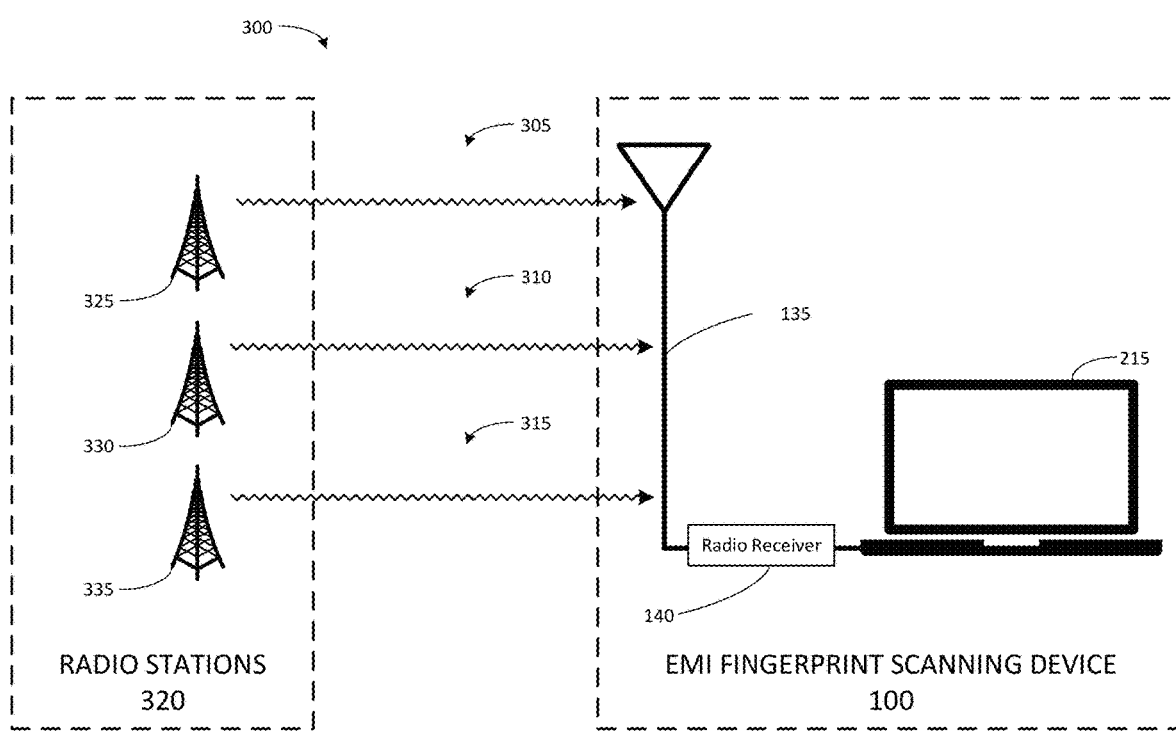
FIG. 3 illustrates one embodiment of an EMI fingerprint scanning device associated with automated calibration of EMI fingerprint scanning instrumentation in an environment where the EMI fingerprint scanning device detects EM signals from radio stations for calibration.

FIG. 3 illustrates one embodiment of an EMI fingerprint scanning device 100 associated with automated calibration of EMI fingerprint scanning instrumentation in an environment 300 where the EMI fingerprint scanning device 100 detects electromagnetic signals 305, 310, 315 from radio stations 320 for calibration.

In one embodiment, electromagnetic signals 305, 310, 315 are broadcast AM or FM radio signals from local radio stations 325, 330, and 335, respectively. In one embodiment, radio receiver 140 receives the radio signals 305, 310, 315 sensed by antenna 135 and calibration logic is configured to convert the received radio signals from analog signals to digital signals and record the power amplitude and frequency of the signals at defined time intervals. In one embodiment, this is performed in a similar manner to that described with reference to the sensed EMI signals discussed with reference to FIG. 2, above. However, the observation frequency may be significantly higher, for example with values recorded every at every tenth of a second. Further, the full range of detectable signals need not be recorded—the recording may be limited to the subset of frequencies reserved for AM or FM (or television) transmission or broadcasting. For example, in the United States, the AM radio band is in the frequency range from 535-1605 kHz. AM radio station carrier frequencies from 540-1600 kHz are assigned at 10 kHz intervals. In the United States, the FM radio band is in the frequency range from 88-108

MHz. FM radio stations are assigned center frequencies at 200 kHz separation starting at 88.1 MHz, with a 75 kHz maximum deviation from the center frequency. Accordingly, the range of sensed frequencies for recording may be limited to ranges that encompass the AM and/or FM radio bands. The electromagnetic signals 305, 310, 315 are broadcast AM or FM radio signals from local radio stations 325, 330, and 335, respectively, will be captured by recordings covering this range.

Figure 4:
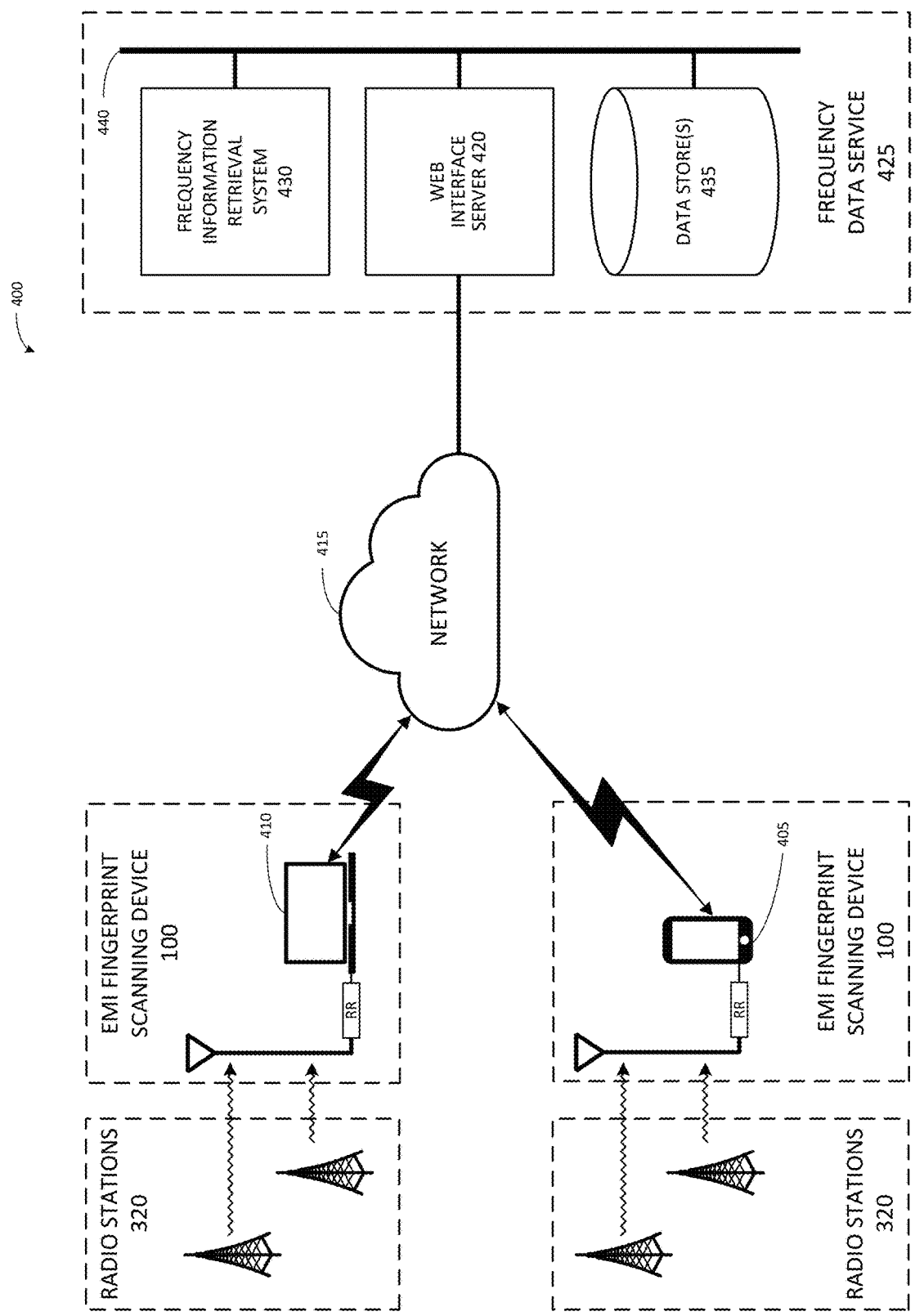
FIG. 4 illustrates one embodiment of an environment in which to calibrate an EMI fingerprint scanning device associated with automated calibration of EMI fingerprint scanning instrumentation.

FIG. 4 illustrates one embodiment of an environment 400 in which to calibrate an EMI fingerprint scanning device 100 associated with automated calibration of EMI fingerprint scanning instrumentation. In one embodiment, EMI fingerprint scanning device 100 is a mobile device 405 or computing device 410 coupled with a software defined radio receiver (such as radio receiver 140) and antenna (such as antenna 135). In one embodiment, network interface 130 is configured to enable the EMI fingerprint scanning device 100 to interact with one or more remote computers over a communications network 415. In one embodiment, the EMI fingerprint scanning device 100 may send requests to and receive responses from web servers such as web interface server 420 of frequency data service 425. In one embodiment, these communications may take the form of remote representational state transfer (REST) requests using JavaScript object notation (JSON) as the data interchange format for example, or in another example, simple object access protocol (SOAP) requests to and from XML servers. In another embodiment, these communications may take the form of interactions with HTML/JavaScript forms on web pages, and parsing of web pages provided in response to the interactions.

In one embodiment, in addition to web interface server 420, frequency data service 425 also includes frequency information retrieval system 430 and one or more data stores 435 on data storage devices. The web interface server 420, frequency information retrieval system 430, and data stores 435 are interconnected by a local network 440. In one embodiment, frequency data service 425 is configured to provide information about assigned radio frequencies in response to requests received through web interface server 420. Data stores 435 include one or more databases that include information including the geographic location and broadcast (transmission) frequencies of each radio (or television) station within a geographic territory. The frequency information retrieval system parses requests received through web interface server 420 and composes queries to the database(s) in data store 435 to respond to the requests with the requested information. Web interface server composes an appropriately formatted response providing the retrieved information through network 415 to the requesting EMI fingerprint scanning device 100.

In one embodiment, the frequency data service 425 is the publicly accessible Federal Communications Commission website, FCC.gov. The FCC maintains a publicly accessible database that includes the geographic location and assigned carrier frequency (AM)/center frequency (FM) (or more generally, broadcast frequency band) for every broadcast AM, FM, and television station in the United States. These broadcast frequencies do not change, but remain consistent. The database also includes other information about the radio stations, such as call sign and broadcast power. The FCC website enables queries to this database, including queries to look up stations based on (i) radius from a given location based on latitude and longitude coordinates, (ii) radius from a given location based on ZIP code, (iii) radius from a given location based on a city/state name, and (iv) assigned broadcast frequency, or combinations thereof. In one embodiment, the results are returned in ascending order of distance from the searched location. Other parties may offer similar functionality. In one embodiment, these queries may be executed by executing the queries at the appropriate pages of the FCC website. The EMI fingerprint scanner may collect the returned information by scraping and parsing the webpage including the results of the query. In one embodiment, the FCC website (or other frequency data service) may expose an API for accepting such queries, for example as REST requests, and returning the query results.

Local Radio Broadcast Frequencies as Reference Sources

In one embodiment, the local broadcast frequencies provided by the frequency data service for a specific location may be used in that specific location as reference sources. These reference sources may be compared against observed broadcast frequencies in a calibration operation for the EMI fingerprint scanning device. In one embodiment, a local radio station is a transmitter of signals detectable by an antenna positioned within a geographic location or region near the geographic location, therefore, the local radio station is "local" to the antenna. In one embodiment, a local radio station is a transmitter authorized to broadcast on a signal in a center frequency or in a carrier frequency within a geographic location at which an antenna is positioned or region near the geographic location, therefore, the local radio station is "local" to the antenna.

Figure 5:
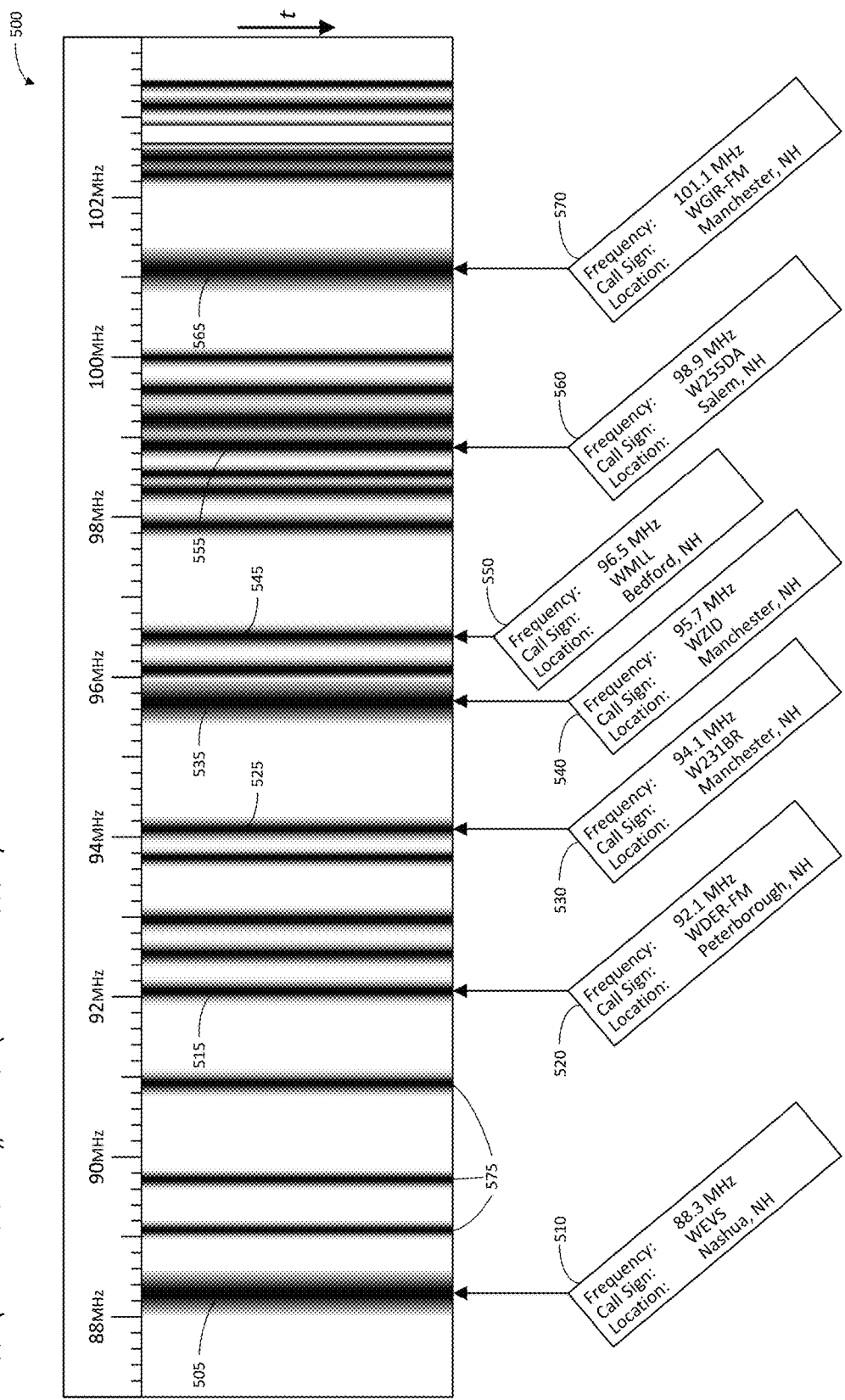
FIG. 5 illustrates an example heat map of radio broadcasting frequency bands collected near Hillsborough County, N.H. by one embodiment of an EMI fingerprint scanning device associated with automated calibration of EMI fingerprint scanning instrumentation.

FIG. 5 illustrates an example heat map 500 of radio broadcasting frequency bands collected near Hillsborough County, N.H. by one embodiment of an EMI fingerprint scanning device associated with automated calibration of EMI fingerprint scanning instrumentation. The heat map 500 shows the presence of signals at a given frequency range over a time period t collected by the EMI fingerprint scanning device operating in a geographic location included in area code 03052 in Hillsborough County, N.H. In one embodiment, t=5 seconds. The heat map 500 shows a constant frequency band (or frequency line) for constant signals at a given frequency. The heat map 500 includes constant frequency bands/lines for each of multiple radio stations near the EMI fingerprint scanning device. ZIP code 03052 was used to query the FCC frequency information databases through fcc.gov, and the resulting radio stations are collected and their respective broadcasting frequency bands, call signs, and station locations are labeled adjacent to the frequency bands/lines. The broadcasting frequency bands in ZIP code 03052 and vicinity are captured exactly in the heat map 500 produced by the EMI fingerprint scanning device.

In particular, frequency band 505 appears at 88.3 MHz and is associated with radio station WEVS broadcasting from Nashua, N.H., as shown in label 510. Frequency band 515 appears at 92.1 MHz and is associated with radio station WDER-FM, broadcasting from Peterborough, N.H., as shown in label 520. Frequency band 525 appears at 91.4 MHz and is associated with radio station W231 BR, broadcasting from Manchester, N.H., as shown in label 530. Frequency band 535 appears at 95.7 MHz and is associated with radio station WZID, broadcasting from Manchester, N.H., as shown in label 540. Frequency band 545 appears at 96.5 MHz and is associated with radio station WMLL, broadcasting from Bedford, N.H., as shown in label 550. Frequency band 555 appears at 98.9 MHz and is associated with radio station W255DA, broadcasting from Salem, N.H., as shown in label 560. Frequency band 565 appears at 101.1 MHz and is associated with radio station WGIR-FM, broadcasting from Manchester, N.H., as shown in label 570.

Note that not all frequency bands are labeled with radio station information, such as frequency bands 575, for example. These frequencies may be associated with radio stations, but they may not be stations in the top N radio stations returned by the query to the FCC database. In this example, only the top 7 radio stations (as shown at labels 510, 520, 530, 540, 550, 560, and 570) may have been requested or selected from the returned results. Or, in this example, there may be only 7 radio stations broadcasting or transmitting within a predetermined radius of ZIP code 03052. Thus, the other frequency bands such as frequency bands 575 may be more distant or emitted by less powerful stations.

Or, the other, unlabeled frequency bands such as frequency bands 575 may represent persistent sources of EMI interference detected by the EMI fingerprint scanning device, for example a nearby unshielded powered device that produces EMI at that frequency.

Figure 6:
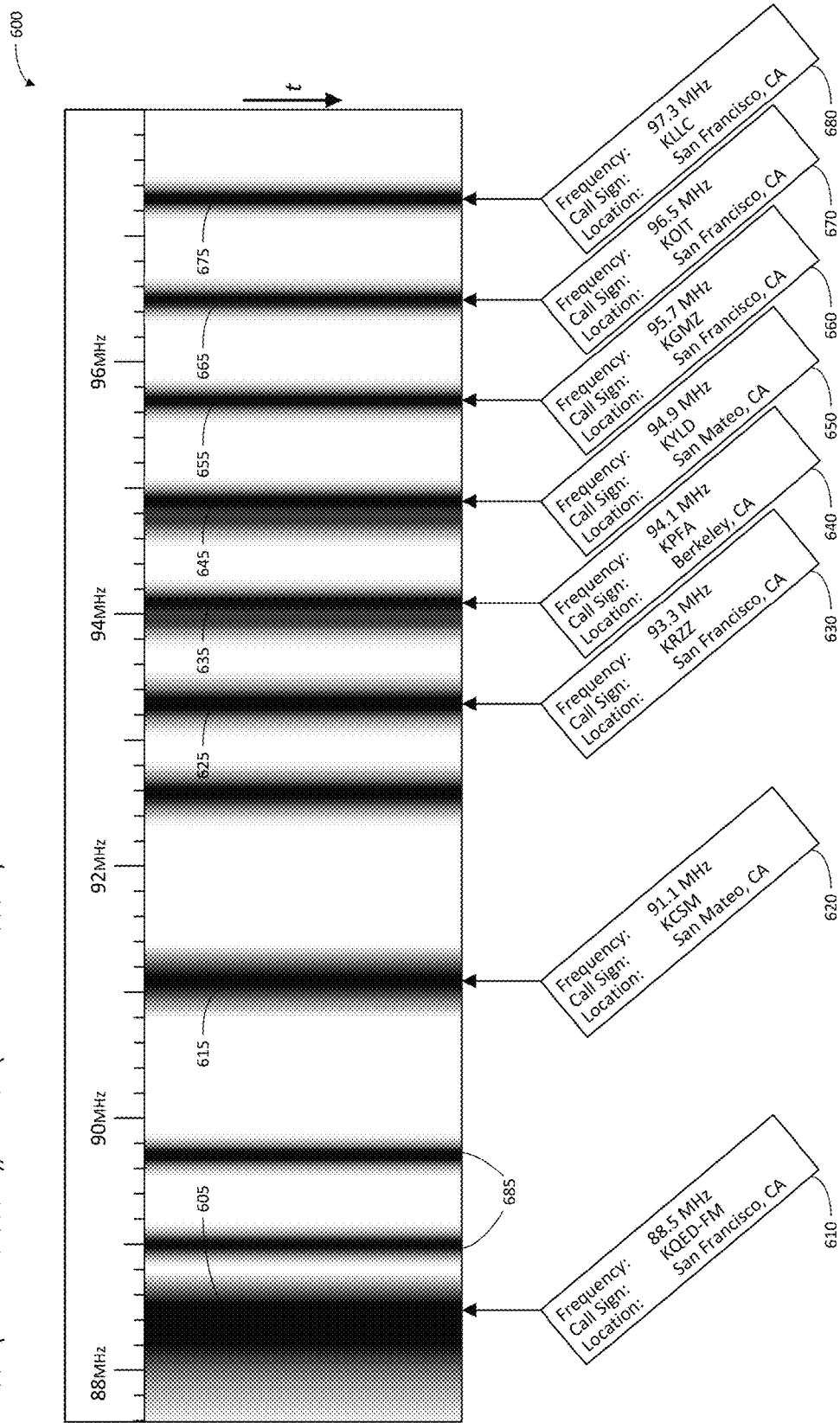
FIG. 6 illustrates an example heat map of radio broadcasting frequency bands collected near San Mateo County, Calif. by one embodiment of an EMI fingerprint scanning device associated with automated calibration of EMI fingerprint scanning instrumentation.

FIG. 6 illustrates an example heat map 600 of radio broadcasting frequency bands collected near San Mateo County, Calif. by one embodiment of an EMI fingerprint scanning device associated with automated calibration of EMI fingerprint scanning instrumentation. The heat map 600 shows the presence of signals at a given frequency over a time period t collected by the EMI fingerprint scanning device operating in a geographic location included in ZIP code 94065 in San Mateo County, Calif. In one embodiment, t=5 seconds. The heat map 600 shows a constant frequency band (or frequency line) for constant signals at a given frequency. The heat map 600 includes constant frequency bands/lines for each of multiple radio stations near the EMI fingerprint scanning device. ZIP code 94065 was used to query the FCC frequency information databases through fcc.gov, and the resulting radio stations are collected and their respective broadcasting frequency bands, call signs, and station locations are labeled adjacent to the frequency bands/lines. The broadcasting frequency bands in area code 94065 and vicinity are captured precisely in the heat map 600 produced by the EMI fingerprint scanning device.

In particular, frequency band 605 appears at 88.5 MHz and is associated with radio station KQED-FM broadcasting from San Francisco, as shown in label 610. Frequency band 615 appears at 91.1 MHz and is associated with radio station KCSM, broadcasting from San Mateo, Calif., as shown in label 620. Frequency band 625 appears at 93.3 MHz and is associated with radio station KRZZ, broadcasting from San Francisco, Calif., as shown in label 630. Frequency band 635 appears at 94.1 MHz and is associated with radio station KPFA, broadcasting from Berkeley, Calif., as shown in label 640. Frequency band 645 appears at 94.9 MHz and is associated with radio station KYLD, broadcasting from San Mateo, Calif., as shown in label 650. Frequency band 655 appears at 95.7 MHz and is associated with radio station KGMZ, broadcasting from San Francisco, Calif., as shown in label 660. Frequency band 665 appears at 96.5 MHz and is associated with radio station KOIT, broadcasting from San Francisco, Calif., as shown in label 670. Frequency band 675 appears at 97.3 MHz and is associated with radio station KLLC, broadcasting from San Francisco, Calif., as shown in label 680.

As with FIG. 5, not all frequency bands shown in FIG. 6 are labeled with radio station information, such as frequency bands 685, for example, and are unlabeled for similar reasons as described with respect to FIG. 5. Note also that the heat maps (such as heat maps 500 and 600) may cover, but need not necessarily cover, the entire portion of the electromagnetic spectrum assigned to FM or AM radio. The heat maps may instead cover only a subset of the assigned spectrum, as shown in FIGS. 5 and 6.

Each of FIGS. 5 and 6 demonstrates that local radio station broadcast signals, in conjunction with information indicating assigned broadcast frequencies for those broadcast signals, can be used as reference sources for automated calibration of EMI fingerprint scanning devices. Alignment between one or more broadcast signal bands detected at a geographic location and one or more local broadcast frequencies assigned to radio stations near that geographic location indicates that the EMI fingerprint scanning device is calibrated. In one embodiment, alignment to within 1% of the published US FCC frequency is considered to be optimal. A heatmap and identification of assigned broadcast frequencies similar to those shown in FIGS. 5 and 6 can be prepared for any geographic location within the United States (as well as within other regions where broadcast frequencies are assigned to radio stations). Accordingly, the user of the EMI fingerprint scanning devices will not need to perform manual calibration before conducting EMI fingerprint counterfeit scans. In one embodiment, the EMI fingerprint scanning device may be configured to present both a "green light" calibration verification and a labeled 2D heatmap on a graphical user interface, thus verifying that the EMI fingerprint scanning device correctly "sees" the nearest radio signals at their exact frequency bands, thereby validating that the software defined radio (SDR) radio frequency (RF) circuitry and fast Fourier transform (FFT) processing is indeed seeing the correct frequency spectrum.

Example Method for Automated Calibration

In one embodiment, each step of computer-implemented methods described herein may be performed by a processor (such as processor 1310 as shown and described with reference to FIG. 13) of one or more computing devices (i) accessing memory (such as memory 1315 and/or other computing device components shown and described with reference to FIG. 13) and (ii) configured with logic to cause the system to execute the step of the method (such as utility power system EMI fingerprint scanning instrumentation automated calibration logic 1330 shown and described with reference to FIG. 13). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1315, or storage/disks 1335 of computing device 1305 or remote computers 1365 shown and described with reference to FIG. 13).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 7:
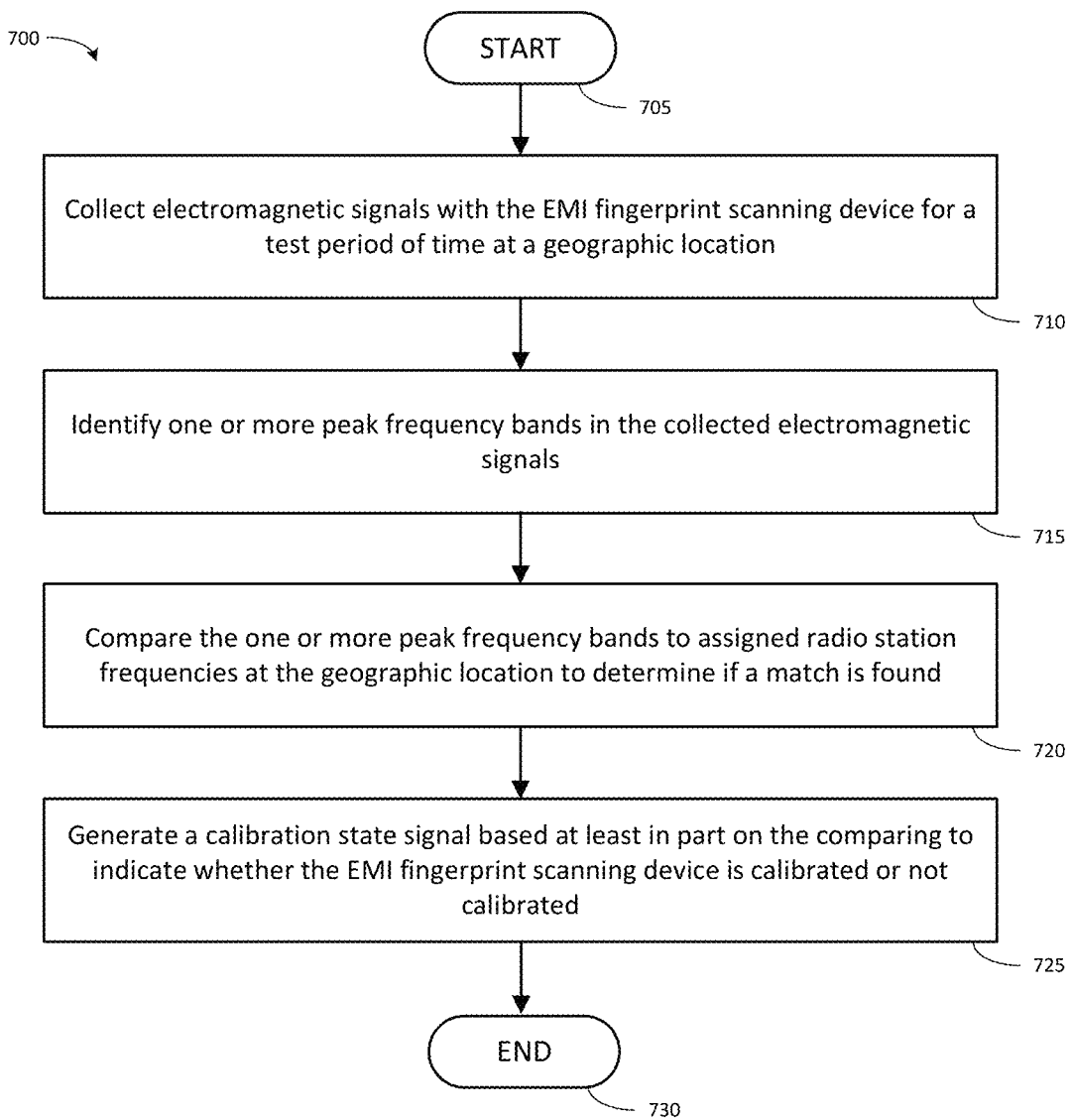
FIG. 7 illustrates one embodiment of a method associated with automated calibration of EMI fingerprint scanning instrumentation.

FIG. 7 illustrates one embodiment of a method 700 associated with automated calibration of EMI fingerprint scanning instrumentation. In one embodiment, the steps of method 700 are performed by EMI fingerprint scanner 100 (as shown and described with reference to FIGS. 1-4). In one embodiment, EMI fingerprint scanner 100 is a special purpose computing device (such as computing device 1305) configured with utility power system EMI fingerprint scanning instrumentation automated calibration logic 1330.

The method 700 may be initiated based on various triggers, such as receiving a signal over a network or parsing stored data indicating that (i) a user (or administrator) of EMI fingerprint scanner 100 has initiated method 700, (ii) that that method 700 is scheduled to be initiated at defined times or time intervals, (iii) that a user (or administrator) of EMI fingerprint scanner 100 has initiated an EMI fingerprint counterfeit scan of a target utility device, or (iv) that EMI fingerprint scanner 100 has completed an EMI fingerprint scan of a target utility device. The method 700 initiates at START block 705 in response to parsing a signal received or stored data retrieved and determining that the signal or stored data indicates that the method 700 should begin. Processing continues to process block 710.

At process block 710, the processor collects electromagnetic signals with the EMI fingerprint scanning device for a test period of time at a geographic location.

In one embodiment, a test period for collection of signals is identified by the processor 105 of the EMI fingerprint scanning device 110. Similarly, an observation interval for recording collected signals is identified by the processor 105. For example, the values of the test period and observation interval may be predetermined periods of time retrieved from respective locations in local data storage 110 or hard coded into calibration logic 160. In one embodiment, the test period is a period of between 1 and 15 seconds, such as 5 seconds, and the sampling interval is between 0.001 and 0.1 seconds, such as 0.01 seconds. Alternatively, the operator of the EMI fingerprint scanning device 110 may be presented with options to enter or modify these default values of the test period and observation interval. For the duration of the test period, the processor accepts electromagnetic signals sensed by antenna 135 and collected by radio receiver 140 within the AM and/or FM radio bands and records the digital values for these signals at each observation interval. Observed signals outside the AM and/or FM radio bands may be disregarded and not recorded. In one embodiment, the observed signals are stored as tuples of observation time, frequency, and power amplitude values (t, f, p) in local data storage 110. In one embodiment, the signals are stored in a flat file data set that has columns for the frequencies and rows for the observations (time), and the power amplitude values at each row-column entry.

In one embodiment, process block 710 is performed while utility devices proximate to the EMI fingerprint scanning device 100 are turned off to reduce noise detected during the calibration process. In one embodiment, process block 710 is performed while the EMI fingerprint scanning device 100 is away from systems that generate significant amounts of EMI to reduce noise detected during the calibration process. In one embodiment, process block 710 is performed while the EMI fingerprint scanning device 100 is placed within a partial Faraday cage to reduce noise detected during the calibration process.

Once the processor has thus completed collecting electromagnetic signals with the EMI fingerprint scanning device for a test period of time at a geographic location, processing at process block 710 completes, and processing continues to process block 715.

At process block 715, the processor identifies one or more peak frequency bands in the collected electromagnetic signals.

In one embodiment, the processor identifies the frequencies that have (i) consistent signal over the test period and (ii) greater power spectral density (PSD) than adjacent frequencies. These frequencies are most likely to be the assigned carrier frequency for an AM radio station or assigned center frequency for an FM radio station. In one embodiment, the system converts the observed radio signals recorded for the test period from a time domain to a frequency domain, for example by performing a fast Fourier transform (FFT) or other appropriate transform on the observed radio signals. The system then calculates a power spectral density for the observed signals over the test period for each frequency, and records the value of power spectral density in local data storage 110 in a data structure associating the PSD value with the frequency. The system then analyzes the PSD values for each frequency to detect the "peak" frequency among nearby frequencies based on the highest PSD values among groups of adjacent frequencies. The frequencies identified as "peak" frequencies based on their power spectral density values over the test period are likely to include assigned carrier/center frequencies for local radio stations. Carrier frequencies and center frequencies may be referred to collectively herein as "broadcast frequencies." The list of detected peak frequency bands is stored as a data structure in local data storage 110 for later retrieval and processing.

Once the processor has thus completed identifying one or more peak frequency bands in the collected electromagnetic signals, processing at process block 715 completes, and processing continues to process block 720.

At process block 720, the processor compares the one or more peak frequency bands to assigned radio station frequencies at the geographic location to determine if a match is found. In one embodiment, a "match" is considered to be when the measured frequency falls within 1% of the frequency published by the US FCC.

In one embodiment, the geographic location of the EMI fingerprint scanner 100 may be retrieved in response to an indication that the geographic location of the EMI fingerprint device is needed in order to make a query of the frequency data service 425. In one embodiment, calibration logic 160 may cause the geographic location of the EMI fingerprint to be requested from the operator of the EMI fingerprint scanner 100. For example, the EMI fingerprint scanning device 100 may present a prompt on a graphical user interface (presented by display 120) of the EMI fingerprint scanning device 100 to input the geographic location. For example, the EMI fingerprint scanning device 100 may generate a form requesting that the user enter a ZIP code, a city and/or state, or a longitude and latitude, and including fields to accept the user's input, and present the form on display 120. Calibration logic 160 may then cause EMI fingerprint scanning device 100 to accept user input in response to the prompt as the geographic location. For example, calibration logic 160 may detect that the user has selected a 'submit' or 'accept' button on the form. In response to detecting the selection of the submit button, the calibration logic 160 causes the data entered by the user in the fields of the form to be checked for validity and then stored in local data storage 110 in a data structure indicating the geographic location of the EMI fingerprint scanning device 100. The geographic location may be retrieved from local data storage 110 when needed.

In one embodiment, calibration logic 160 may cause the geographic location of the EMI fingerprint to be requested from GPS receiver 155. Calibration logic 160 generates an instruction to collect the current latitude and longitude from GPS receiver 155. In response to collecting the current latitude and longitude from GPS receiver 155, the calibration logic 160 causes the current latitude and longitude to be stored in local data storage 110 in a data structure indicating the geographic location of the EMI fingerprint scanning device 100. The geographic location may be retrieved from local data storage 110 when needed.

Note that latitude and longitude information may be provided by the GPS receiver 155 in decimal degree format, and require conversion to degrees-minutes-seconds format before use in the query of the frequency data service, or vice versa. Calibration logic 160 may effect these conversions by applying the applicable conversion formulas. Additionally, ZIP code (or city/state) information may be required to be converted to latitude and longitude format. Calibration logic 160 may effect these conversions by looking up the ZIP code (or city/state) in a table of representative latitudes and longitudes for ZIP codes (or city/states).

In one embodiment, the processor retrieves information about a radio station identified as being local to the geographic location, for example by being identified as being located within a certain radius of the geographic location. In one embodiment, the EMI fingerprint scanning device requests information for radio stations near the geographic location from a frequency data service. In one embodiment, the EMI fingerprint scanning device 100 uses at least a portion of information returned by the frequency data service to determine whether to generate a match signal or a no-match signal. For example, the information returned about the radio station is used to determine whether one or more of the peak frequencies in the list is broadcast by the local radio station, and if one or more of the peak frequencies in the list is broadcast by the local radio station (to within 1% of the local broadcast frequency, in one embodiment), a match signal is generated. The comparison and matching are discussed in further detail below with reference to FIGS. 8A and 8B.

Once the processor has thus completed comparing the one or more peak frequency bands to assigned radio station frequencies at the geographic location to determine if a match is found, processing at process block 720 completes, and processing continues to process block 725.

At process block 725, the processor generates a calibration state signal based at least in part on the comparing to indicate whether the EMI fingerprint scanning device is calibrated or not calibrated.

In one embodiment, in response to the comparison indicating that at least one match is found, calibration logic 160 determines that the calibration state of the EMI fingerprint scanning device 100 is "calibrated." The calibration logic 160 causes the EMI fingerprint scanner to generate a data value indicating that the EMI fingerprint scanning device 100 is "calibrated," and write the value to a data structure in local data storage 110. The stored data value serves as the signal that the EMI fingerprint scanning device 100 is calibrated.

In one embodiment, in response to the comparison indicating that no match is found, calibration logic 160 determines that the calibration state of the EMI fingerprint scanning device 100 is "not calibrated." The calibration logic 160 causes the EMI fingerprint scanner to generate a data value indicating that the EMI fingerprint scanning device 100 is "not calibrated," and write the value to a data structure in local data storage 110. The stored data value serves as the signal that the EMI fingerprint scanning device 100 is not calibrated.

Once the processor has thus completed generating a calibration state signal based at least in part on the comparing to indicate whether the EMI fingerprint scanning device is calibrated or not calibrated, processing at process block 725 completes, and processing continues to END block 730, where process 700 ends.

Example Methods for Comparison with Assigned Frequencies

Referring again to process block 720, note that there are multiple methods by which the one or more peak frequency bands can be compared to assigned radio station frequencies at the geographic location to determine if a match is found. Two example methods are described below.

Figure 8B:
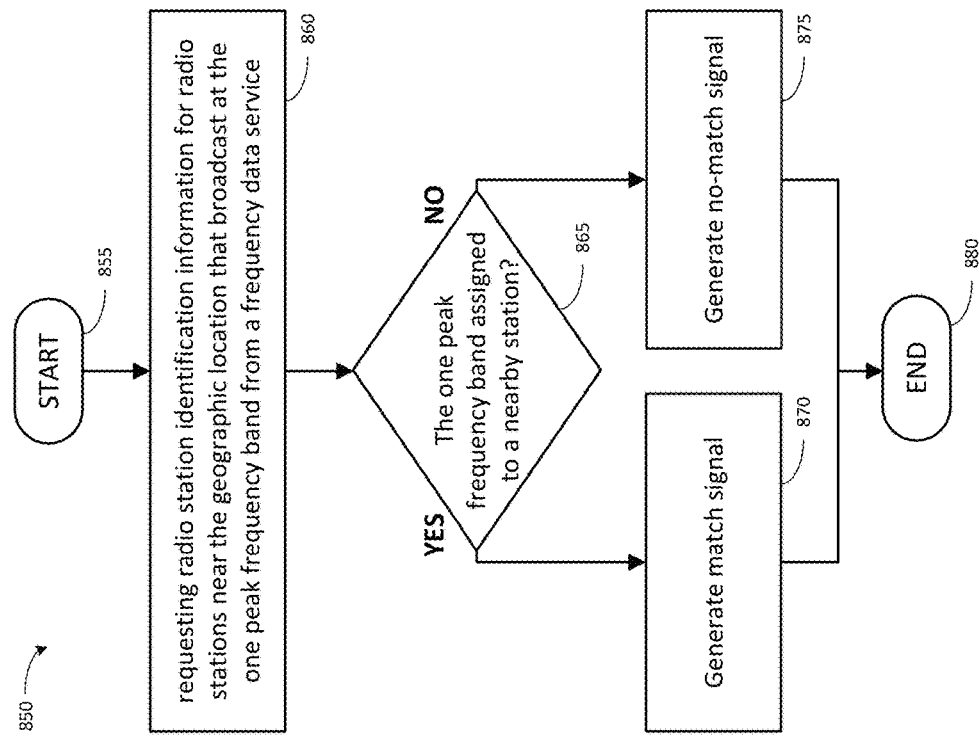
FIG. 8B illustrates another embodiment of a method associated with comparing peak frequency bands to assigned radio station frequencies in automated calibration of EMI fingerprint scanning instrumentation.
Figure 8A:
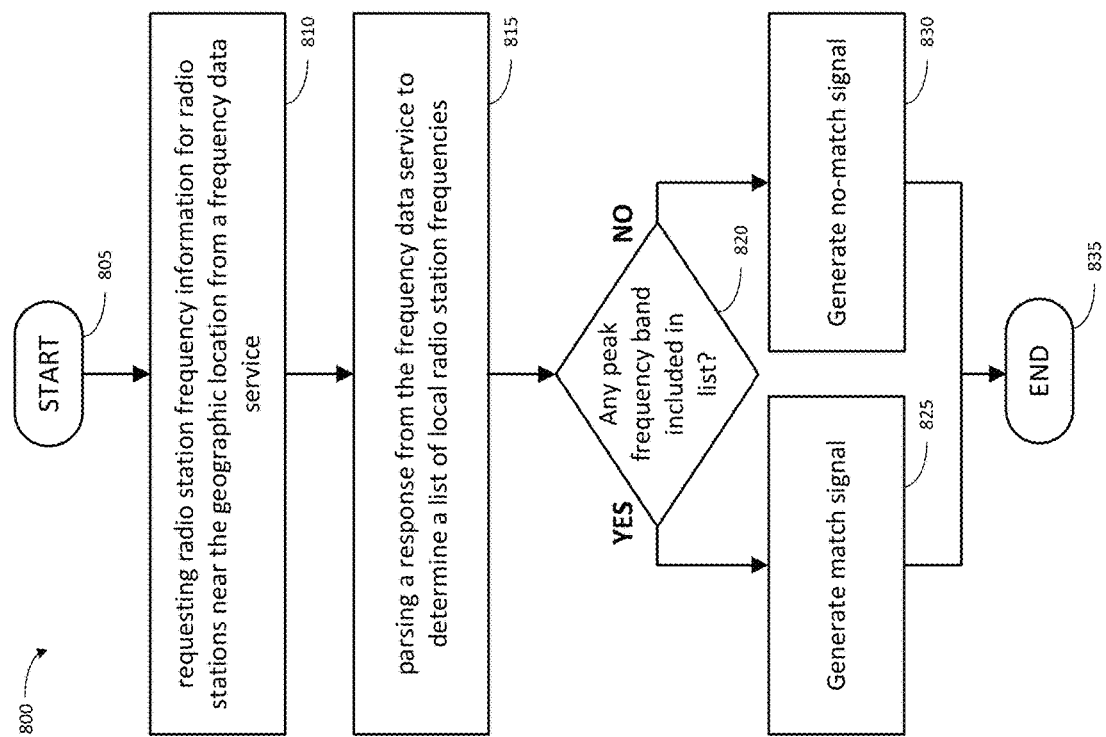
FIG. 8A illustrates one embodiment of a method associated with comparing peak frequency bands to assigned radio station frequencies in automated calibration of EMI fingerprint scanning instrumentation.

In one embodiment, the comparison is performed locally on the EMI fingerprint scanning device 100 in response to retrieving a list of frequencies assigned to local radio stations. FIG. 8A illustrates one embodiment of a method 800 associated with comparing peak frequency bands to assigned radio station frequencies in automated calibration of EMI fingerprint scanning instrumentation. In one embodiment, the method 800 is performed as part of method 700, in particular as part of process block 720. In one embodiment, the method 800 is performed by EMI fingerprint scanning device 100. The method 800 initiates at START block 805 in response to parsing a signal received or stored data retrieved that indicates that the method 800 should begin, for example the initiation of process block 720 in method 700. Processing continues to process block 810.

At process block 810, the processor requests radio station frequency information for radio stations near the geographic location from a frequency data service. In one embodiment, calibration logic 160 causes the EMI fingerprint scanning device 100 to compose a request for at least the frequencies, call signs, and station locations of all radio stations within a certain radius (for example, 100 kilometers) of the geographic location from the frequency data service 425. For example, the request may be a REST request. The EMI fingerprint scanning device 100 transmits the request from network interface 130 through network 415 to web interface server 420 of frequency data service 425, which processes the request. Once the processor has thus completed requesting radio station frequency information for radio stations near the geographic location from a frequency data service, processing at process block 810 completes, and processing continues to process block 815.

At process block 815, the processor parses a response from the frequency data service to determine a list of local radio station frequencies. In one embodiment, the frequency information retrieval system 430 retrieves the requested information from database in data store 435. The web interface server generates a response, such as a web page or REST request, and transmits it through network 415 to network interface 130 of EMI fingerprint scanning device 100. Calibration logic 160 causes the EMI fingerprint scanning device 100 to parse the response to extract a list of local radio station frequencies and their associated call signs and station locations. Calibration logic 160 causes the EMI fingerprint scanning device 100 to store the list as a data structure in local data storage 110. Once the processor has thus completed parsing a response from the frequency data service to determine a list of local radio station frequencies, processing at process block 815 completes, and processing continues to decision block 820.

At decision block 820, the processor determines if any of the one or more peak frequency bands is included in the list. In one embodiment, calibration logic 160 causes the EMI fingerprint scanning device 100 to retrieve (i) the list of local radio station frequencies and their associated call signs and station locations and (ii) the list of detected peak frequency bands generated at process block 715 of method 700 above. Calibration logic 160 then causes the EMI fingerprint scanning device 100 to compare each of the detected peak frequency bands to the list of frequencies assigned to local radio stations until at least one peak frequency band is found to be included in the list of assigned frequencies (to within 1% of the assigned frequencies, in one embodiment), or until it is determined that no peak frequency band is included in the list of assigned frequencies. If any peak frequency band is included in the list (YES), processing at decision block 820 completes, and processing continues to process block 825. If no peak frequency band is included in the list (NO), processing at decision block 820 completes, and processing continues to process block 830.

At process block 825, the processor generates a match signal, because a peak frequency band was included in the list. In one embodiment, in response to finding at least one match between a detected peak frequency band and a frequency assigned to a local radio station, calibration logic 160 causes the EMI fingerprint scanning device to generate a data value that a match is found and write the value to a data structure in local data storage 110. In one embodiment, the data value is a list of the one or more assigned radio frequencies (and associated call signs and locations) that match detected peak frequency bands (identified by their frequency). Once the processor has thus completed generating a match signal, processing at process block 825 completes, and processing continues to END block 835, where process 800 ends.

At process block 830, the processor the processor generates a no-match signal, because no peak frequency band was included in the list. In one embodiment, in response to finding no matches between the detected peak frequency bands and frequencies assigned to local radio stations, calibration logic 160 causes the EMI fingerprint scanning device to generate a data value that a match is not found and write the value to a data structure in local data storage 110. In one embodiment, the data value indicates that the set of matching stations and frequency bands is a NULL or empty set. The stored data value serves as the match signal. Once the processor has thus completed generating a no-match signal, processing at process block 830 completes, and processing continues to END block 835, where method 800 completes.

In another embodiment, the comparison is performed remotely, as an incidental feature of one or more requests to the frequency data service 425. FIG. 8B illustrates another embodiment of a method 850 associated with comparing peak frequency bands to assigned radio station frequencies in automated calibration of EMI fingerprint scanning instrumentation. In one embodiment, the method 850 is performed as part of method 700, in particular as part of process block 720. In one embodiment, the method 850 is performed by EMI fingerprint scanning device 100. The method 850 initiates at START block 855 in response to parsing a signal received or stored data retrieved that indicates that the method 850 should begin, for example the initiation of process block 720 in method 700. Processing continues to process block 860.

At process block 860, the processor requests radio station identification information for radio stations near the geographic location that broadcast or transmit at the one peak frequency band from a frequency data service. In one embodiment, calibration logic 160 causes the EMI fingerprint scanning device 100 to compose a request for at least the call signs, and station locations of all radio stations within a certain radius (for example, 100 kilometers) of the geographic location from the frequency data service 425 that are broadcasting at the one peak frequency band. For example, the request may be a REST request. The EMI fingerprint scanning device 100 transmits the request from network interface 130 through network 415 to web interface server 420 of frequency data service 425, which processes the request. Once the processor has thus completed requesting radio station identification information for radio stations near the geographic location that broadcast at the one peak frequency band from a frequency data service, processing at process block 860 completes, and processing continues to decision block 865.

At decision block 865, the processor parses a response from the frequency data service to determine if the one peak frequency band is assigned to a radio station. In one embodiment, the In one embodiment, the frequency information retrieval system 430 retrieves the requested information from database in data store 435. The web interface server generates a response, such as a web page or REST request, and transmits it through network 415 to network interface 130 of EMI fingerprint scanning device 100. Where there is a radio station within the radius that is assigned to broadcast on the one peak frequency band, the response includes a call sign and location information for that radio station. Where there is no radio station within the radius that is assigned to broadcast on the one peak frequency band, the response is NULL, empty, or otherwise does not include any call sign or location information. Calibration logic 160 causes the EMI fingerprint scanning device 100 to parse the response to determine if a radio station is identified or if the response is does not identify a radio station. Calibration logic 160 causes the EMI fingerprint scanning device 100 to add the assigned frequency, call sign, and station information, if any, to a list of matches in local data storage 110.

Thus, the return of station information (call sign, location, etc.) in response to a query about the one peak frequency band indicates a match with the identified station, and the absence of station information in response to a query about the one peak frequency indicates no match with a radio station. If the response includes a radio station identification for the one peak frequency band (YES), processing at decision block 865 completes, and processing continues to process block 870. If the response does not include a radio station identification for the one peak frequency band (NO), processing at decision block 865 completes, and processing continues to process block 875.

At process block 870, the processor generates a match signal, because the response included a radio station identification for the one peak frequency band. The match signal is generated as described with reference to process block 825 above. Processing at process block 870 completes, and processing continues to END block 880, where process 850 ends.

At process block 875, the processor generates a no-match signal, because the response did not include a radio station identification for the one peak frequency band. The no-match signal is generated as described with reference to process block 830 above. Processing at process block 875 completes, and processing continues to END block 880, where method 850 completes.

Further Example Methods for Automated Calibration

Figure 9:
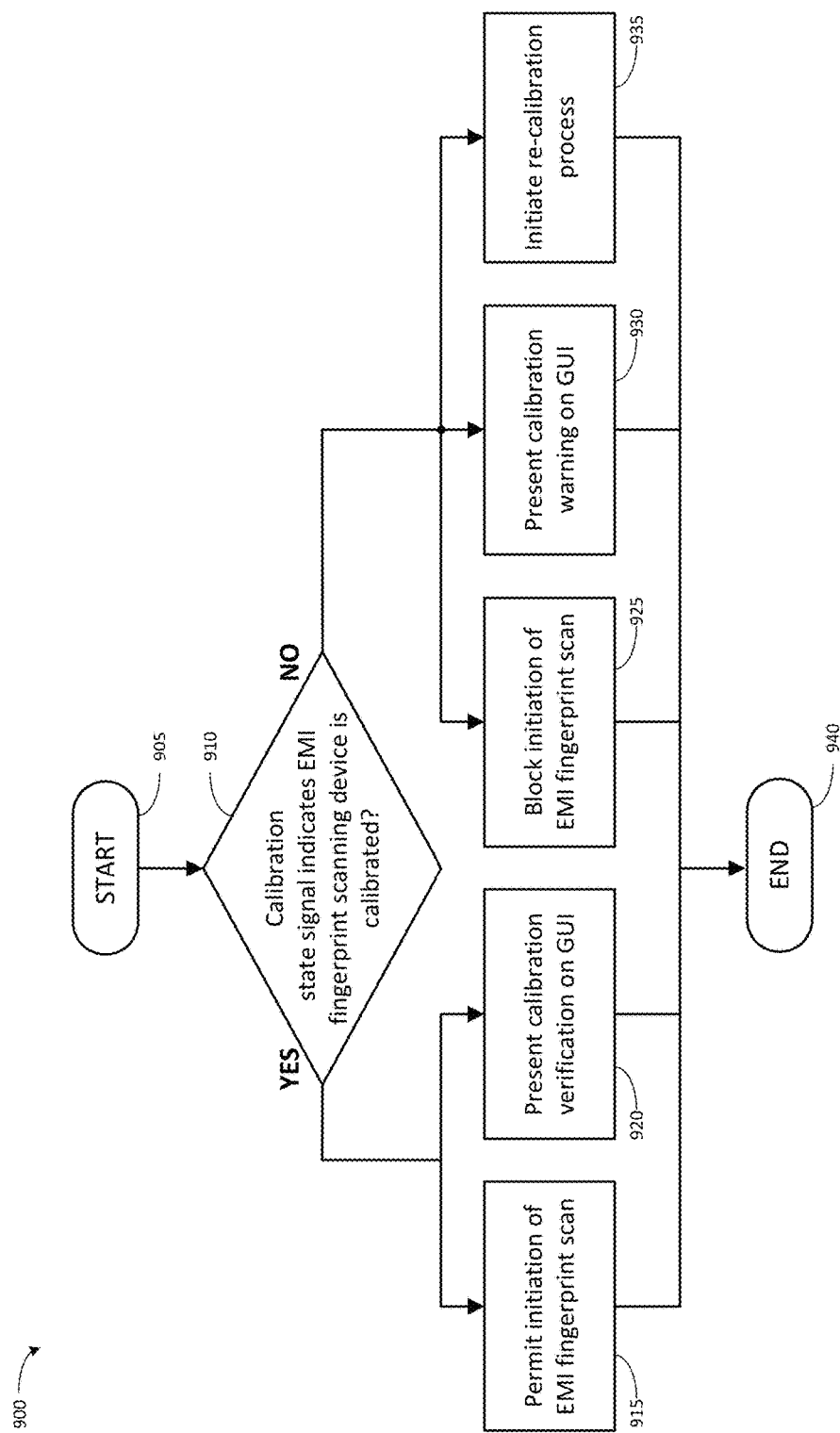
FIG. 9 illustrates one embodiment of a method associated with automated calibration of EMI fingerprint scanning instrumentation.

FIG. 9 illustrates one embodiment of a method associated with automated calibration of EMI fingerprint scanning instrumentation. In one embodiment, the method 900 is performed as a continuation of method 700, in particular in response to the calibration state signal generated at process block 725. In one embodiment, the steps of method 900 are performed by EMI fingerprint scanning device 100. The method 900 initiates at START block 805 in response to parsing a signal received or stored data retrieved that indicates that the method 900 should begin, for example the completion of process block 725 in method 700. Processing continues to decision block 910.

At decision block 910, the processor determines if the calibration state signal indicates that the EMI fingerprint scanning device is calibrated. In one embodiment, calibration logic 160 causes the EMI fingerprint scanning device 100 to retrieve the calibration state signal from local data storage 110. Calibration logic 160 causes the EMI fingerprint scanning device 100 to parse the value of the calibration state signal to determine if it indicates "calibrated" or "not calibrated." If the calibration state signal indicates that the EMI fingerprint scanning device indicates that the EMI fingerprint scanning device is calibrated (YES) processing proceeds to one or more of process blocks 915 and 920. If the calibration state signal indicates that the EMI fingerprint scanning device indicates that they EMI fingerprint scanning device is not calibrated (NO) processing proceeds to one or more of process blocks 925, 930, and 935.

In one embodiment, shown for example by process blocks 915 and 925, proceeding to perform an EMI fingerprint scan of a target device may be allowed or blocked based on whether or not the EMI fingerprint scanning device is determined to be calibrated. At process block 915, in response to the calibration state signal indicating the EMI fingerprint scanning device is calibrated, the processor permits initiation of an EMI fingerprint scan of a target device using the EMI fingerprint scanning device. For example, the permission is effected by enabling or making accessible a "start scan" button or similar scan initiation option to the operator of the EMI fingerprint scanning device 100. For example, the button may be revealed in a GUI where it was previously hidden, or enabled to initiate the EMI fingerprint scan of a target device where the button was not previously so enabled. Selection of the start scan button may then be detected and an EMI fingerprint scan of a target device initiated by fingerprint logic 165. Processing at process block 915 then completes, and processing continues to END block 940, where method 900 completes.

Conversely, at process block 925, in response to the calibration state signal indicating the EMI fingerprint scanning device is not calibrated, the processor prevents initiation of the EMI fingerprint scan of the target device using the EMI fingerprint scanning device. For example, the prevention is effected by disabling or making inaccessible a "start scan" button or similar scan initiation option to the operator of the EMI fingerprint scanning device 100. For example, the button may be hidden or not made visible in a GUI. Or, the "start scan" button may be disabled, and selection of the start scan button will not cause initiation of an EMI fingerprint scan of a target device. Processing at process block 915 then completes, and processing continues to END block 940, where method 900 completes. Processing at process block 915 completes, and processing continues to END block 940, where method 900 completes.

In one embodiment, shown for example by process blocks 920 and 930, a visual indication or icon representing the calibration state of the EMI fingerprint scanning device may be presented on a graphical user interface. This advantageously simplifies the interpretation of the results of the calibration process, such as method 700. At process block 920, the processor causes a display of the EMI fingerprint scanning device to present a visual calibration verification on a graphical user interface of the scanning device in response to the calibration state signal indicating the EMI fingerprint scanning device is calibrated. In one embodiment, the processor generates a GUI including the visual calibration verification. The processor then transmits the GUI to the display 120. Display 120 presents the GUI, showing the visual calibration verification.

Figure 10B:
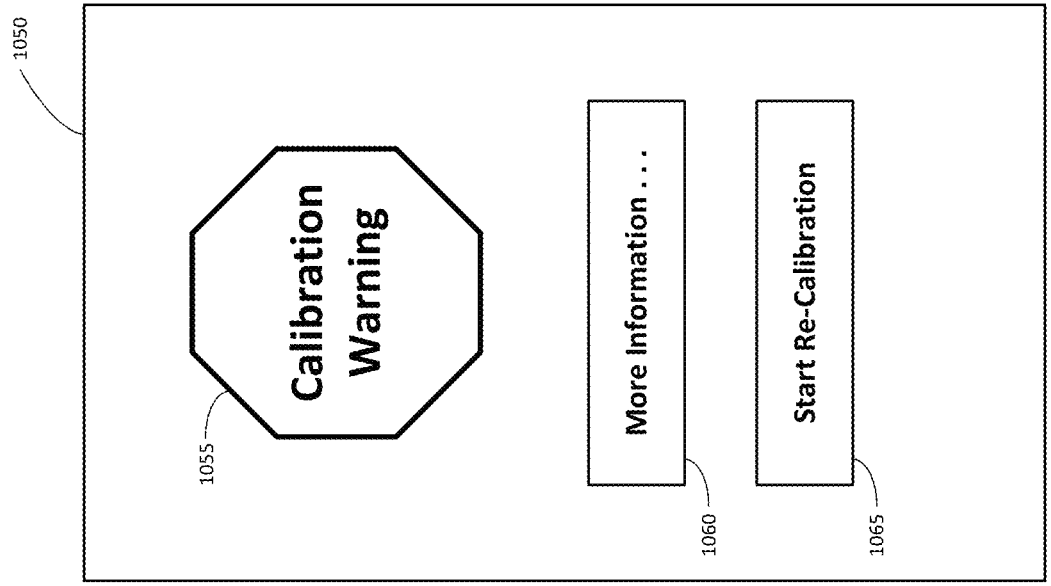
FIG. 10B illustrates one embodiment of a graphical user interface associated with warning a user of an EMI fingerprint scanning device that the EMI fingerprint scanning device is not properly calibrated.
Figure 10A:
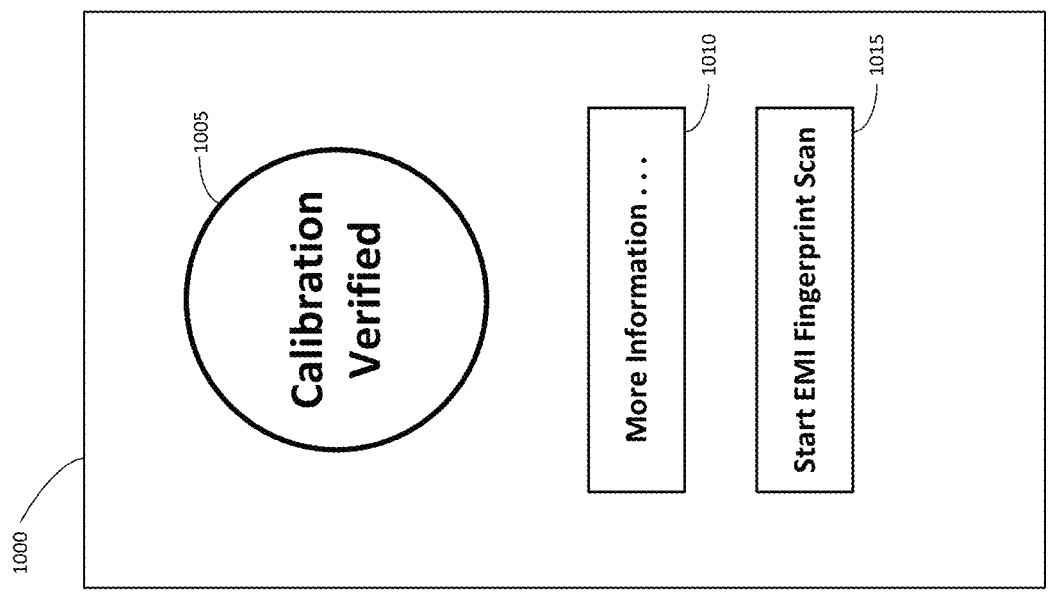
FIG. 10A illustrates one embodiment of a graphical user interface associated with notifying a user of an EMI fingerprint scanning device that the EMI fingerprint scanning device is properly calibrated.

Referring now to FIG. 10A, FIG. 10A illustrates one embodiment of a graphical user interface 1000 associated with notifying a user of an EMI fingerprint scanning device that the EMI fingerprint scanning device is properly calibrated. In one embodiment, the visual calibration verification may take the form of "calibration verified" icon 1005. Icon 1005 may be green, in order to signal a "green light" to proceed with an EMI fingerprint scan. In one embodiment, a graphical "more information" button 1010 may be selected to cause the GUI to show additional information about why the calibration is verified. For example, selection of button 1010 may cause a calibration heat map labeled with the matching local radio frequencies to be displayed on the GUI. In one embodiment, a graphical "start EMI fingerprint scan" button 1015 is presented. Selection of this button will cause EMI fingerprint scanning device 100 to start an EMI fingerprint scan according to fingerprint logic 165.

Referring again to FIG. 9, processing at process block 920 then completes, and processing continues to END block 940, where method 900 completes.

At process block 930, the processor causes a display of the EMI fingerprint scanning device to present a visual calibration warning on a graphical user interface of the scanning device in response to the calibration state signal indicating the EMI fingerprint scanning device is not calibrated. In one embodiment, the processor generates a GUI including the visual calibration warning. The processor then transmits the GUI to the display 120. Display 120 presents the GUI, showing the visual calibration warning.

Referring now to FIG. 10B, FIG. 10B illustrates one embodiment of a graphical user interface 1050 associated with warning a user of an EMI fingerprint scanning device that the EMI fingerprint scanning device is not properly calibrated. In one embodiment, the visual calibration warning may take the form of "calibration warning" icon 1055. Icon 1055 may be red and octagonal to suggest the color and form of a stop sign, in order to suggest that the user may not proceed with an EMI fingerprint scan. In one embodiment, a graphical "more information" button 1060 may be selected to cause the GUI to show additional information about why the calibration is not verified or has failed. For example, selection of button 1060 may cause a calibration heat map labeled with the local radio frequencies (which do not align with the observed frequency bands) to be displayed on the GUI. In one embodiment, a graphical "start re-calibration" button 1065 is presented. Selection of this button will cause EMI fingerprint scanning device 100 to start a self-recalibration process (such as shown and described with reference to FIG. 12) in accordance with calibration logic 160.

Referring again to FIG. 9, processing at process block 930 then completes, and processing continues to END block 940, where method 900 completes.

As mentioned above, in one embodiment, a self-re-calibration process may be performed by an EMI fingerprint scanning device that is determined to be out of calibration, as shown for example at process block 935. At process block 935, the processor initiates a re-calibration process to cause calibration of the EMI fingerprint scanning device to be corrected in response to the calibration validation signal indicating the EMI fingerprint scanning device is not calibrated. In one embodiment, calibration logic 160 causes EMI fingerprint scanning device 100 to load the re-calibration process from local data storage 110 and commence execution of the re-calibration process. Once the re-calibration process is thus initiated, processing at process block 935 completes, and processing continues to END block, where method 900 completes.

Calibration Proof for EMI Fingerprints

Figure 11:
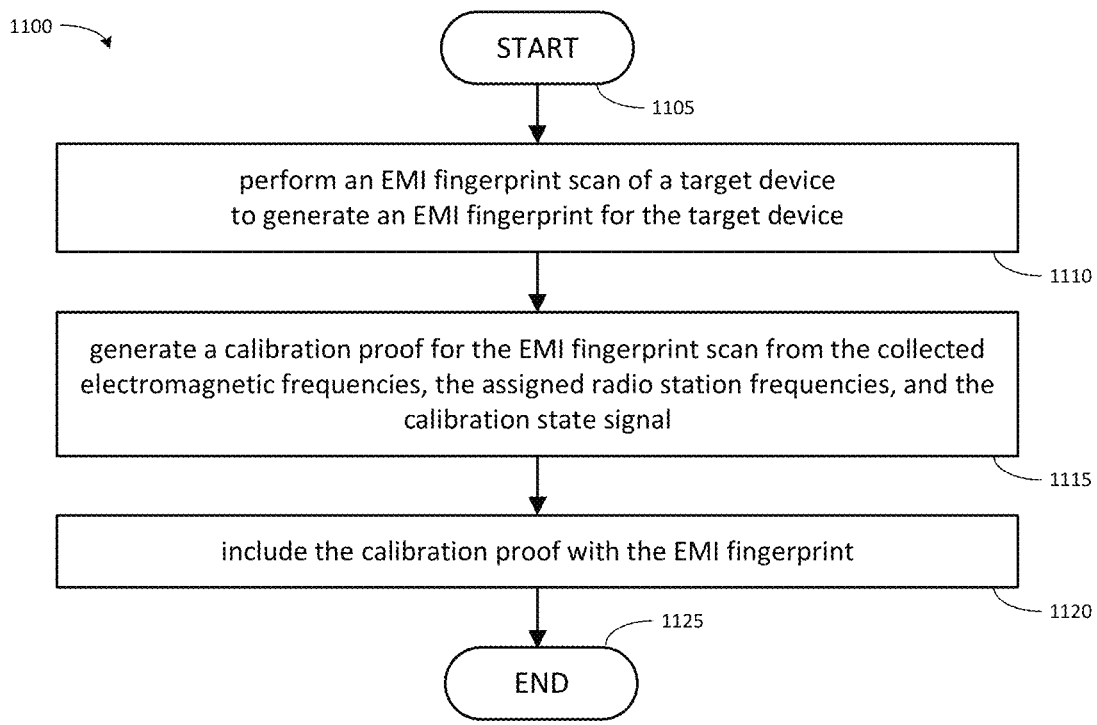
FIG. 11 illustrates one embodiment of a method associated with generating calibration proof to show that an EMI fingerprint of a target device was created by a correctly calibrated EMI fingerprint scanning device.

FIG. 11 illustrates one embodiment of a method 1100 associated with generating calibration proof to show that an EMI fingerprint of a target device was created by a correctly calibrated EMI fingerprint scanning device. In one embodiment, the steps of method 1100 are performed are performed by EMI fingerprint scanning device 100 in accordance with calibration logic 160 and fingerprint logic 165. In one embodiment, method 1100 may follow from permitting initiation of an EMI fingerprint scan of a target device using the EMI fingerprint scanning device in response to the calibration state signal indicating the EMI fingerprint scanning device is calibrated, as shown and described with reference to process block 915 of method 900. The method 1100 initiates at START block 1105 in response to parsing a signal received or stored data retrieved that indicates that the method 1100 should begin, for example an indication that an EMI fingerprint scan of a target device has been initiated. Processing continues to process block 1110.

At process block 1110, the processor performs an EMI fingerprint scan of a target utility device to generate an EMI fingerprint for the target utility device.

In one embodiment, the EMI fingerprint scanning device performs the scan in accordance with fingerprint logic 165. The EMI fingerprint scanning device 100 collects target EMI signals emitted by a target utility device (or "unit under test," UUT) undergoing a sequence of test operations. In one embodiment, the sequence of test operations last for nominally 10 minutes, the scan is conducted over these 10 minutes. The EMI fingerprint scanning device 100 generates a target EMI fingerprint for the target device from the collected target EMI signals. The EMI fingerprint scanning device 100 compares the target EMI fingerprint to a reference EMI fingerprint for a reference utility device that is verified to be a genuine device (or "golden system," GS) of the same type as the target utility device. The EMI fingerprint scanning device determines, based on the results of the comparison, whether the target utility device is genuine or contains one or more counterfeit electronic components. The EMI fingerprint scanner stores the target EMI fingerprint and the determination of genuine or counterfeit in local data store 110.

In one embodiment, the collected target EMI signals and reference EMI signals in the reference EMI fingerprint are subjected to a fast Fourier transform (FFT) operation to transform the respective sets of EMI signals from a time-domain representation to a frequency domain representation. A non-linear, non-parametric regression model, such as a multivariate state estimation technique (MSET) model is trained using the transformed (frequency domain) reference EMI signals. The trained MSET model is provided the transformed (frequency domain) target EMI signals as inputs to produce estimated values for the target EMI signals. The comparison of the reference and target EMI signals is based at least in part on these estimated values.

Once the processor has thus completed performing an EMI fingerprint scan of a target utility device to generate an EMI fingerprint for the target utility device, processing at process block 1110 completes, and processing continues to process block 1115.

At process block 1115, the processor generates a calibration proof for the EMI fingerprint scan from the collected electromagnetic frequencies, the assigned radio station frequencies, and the calibration state signal.

In one embodiment, the flat file data set generated for the test period at process block 710 as shown and described with reference to FIG. 700 serves as a basis for a heat map of observed signals over the test period for the EMI fingerprint scanning device at its current geographic location. The heat map generated is similar to example heat maps 500 and 600. The heat map for the test period can generated by plotting the observed power amplitude values against frequency and time with points having an intensity of color saturation that varies according to the observed power amplitude value. For example, in example heat maps 500 and 600, higher power amplitude values were plotted in darker shades of grey, with the highest values approaching black, while lower power amplitude values were plotted in lighter shades of grey, approaching white. Other colors than black and white may be suitable for a graphical user interface. Labels indicating assigned local radio station frequencies (and additionally call sign and location if desirable) can be applied at the corresponding frequency value on the frequency axis based on the assigned frequency bands for geographically proximate radio stations retrieved at process block 720. The application of labels to the heat map serves as a visual confirmation of the EMI fingerprint scanning device's determination that the EMI fingerprint scanning device 100 is calibrated or not calibrated. For the purposes of calibration proof, the labels should align with observed frequency bands. If the labels align, the labeled heat map contributes to the proof of calibration. If the labels do not align with observed frequency bands, the labeled heat map contributes to proof of miscalibration.

In one embodiment, the calibration proof is a data structure including the value of the calibration state signal for the calibration process, heat map information for the calibration process, labels for the heat map made up of the assigned local radio station frequencies, call signs, and broadcast locations retrieved from the frequency data provider such as the FCC database during the calibration process. In one embodiment, the EMI fingerprint scanning device 100 stores the data used to generate the heat map—the flat file data set generated for the test period—as part of the calibration proof data structure in local data storage 110. In one embodiment, the EMI fingerprint scanning device 100 stores the data used to generate the labels on the heat map—assigned local radio station frequencies, call signs, and broadcast locations—as part of the calibration proof data structure in local data storage 110. In one embodiment, the EMI fingerprint scanning device 100 stores the value of the calibration state signal as part of the calibration proof data structure in local data storage 110. In one embodiment, the EMI fingerprint scanning device 100 generates an image of the heat map, with labels applied, and stores it as part of the calibration proof data structure in local data storage 110. In one embodiment, the image of the heat map may include the value of the calibration state signal, such as text indicating "calibrated" or "not calibrated," or a visual calibration verification or warning, such as "calibration verified" icon 1005 or "calibration warning" icon 1055 respectively, may be included in the image.

In one embodiment, no image is included in the calibration proof data structure. The image may be constructed following a read of the calibration proof data structure from the other data included in the calibration proof data structure—calibration state signal, the flat file data set, and the assigned radio frequency labels. In another embodiment, the image is included in the calibration proof data structure, but the underlying calibration state signal, flat file data set, and assigned radio frequency labels are not. This configuration may be used primarily for visual verification of the calibration state. In another embodiment, both the image and the underlying data are included in the calibration proof data structure.

Once the processor has thus completed generating a calibration proof for the EMI fingerprint scan from the collected electromagnetic frequencies, the assigned radio station frequencies, and the calibration state signal, processing at process block 1115 completes, and processing continues to process block 1120.

At process block 1120, the processor includes the calibration proof with the EMI fingerprint. In one embodiment, the EMI fingerprint scanning device 100 retrieves each of the target EMI fingerprint, the determination of genuine or counterfeit, and the calibration proof data structure from local data store 110. The EMI fingerprint scanning device 100 and creates a combination data structure in local data store 110 that includes each of the target EMI fingerprint, the determination of genuine or counterfeit, and the calibration proof data structure. In response to a request for the EMI fingerprint, the EMI fingerprint scanning device returns the combination data structure. Once the processor has thus completed including the calibration proof with the EMI fingerprint, processing at process block 1120 completes, and processing continues to END block 1125, where method 1100 ends.

In one embodiment, the calibration procedure as shown and described with reference to FIGS. 7 and 11 is automatically performed without indication to the user. For example, the calibration procedure may be automated so transparently to the scanner operator that before, after, or before and after a target utility asset is scanned and the target EMI fingerprint is saved, an auto-calibrate procedure will be conducted and the calibration heatmap image(s) (and/or other calibration verification information) will get saved with the official EMI Fingerprint scan. The calibration procedure commonly takes under 10 seconds, so it is not very noticeable to a human operator running a scan that takes 10 minutes or more. This Before/After capture and certification that the instrumentation was fully calibrated during each and every EMI fingerprint scan of a target utility asset, with the calibration proof being saved with the digitized EMI Fingerprint for the target utility asset, is an extremely valuable addition to certification of the absence of counterfeits. It confirms that the certification is accurate, and provides quantitative evidence for taking action against counterfeits detected in the supply chain. For example, where a counterfeit is detected at a port of entry/egress, false identifications can be very costly. A Type-I, false alert error due to miscalibration may unnecessarily halt large shipments of cargo. A Type-II, missed alert error due to miscalibration may bypass the opportunity to remove large numbers of devices with counterfeit components from the supply chain while they are all in one place.

Frequency Self-Re-Calibration

In one embodiment, a method for recalibrating an electromagnetic scanner includes detecting one or more peak frequency bands in electromagnetic signals collected by the electromagnetic scanner at a geographic location; and recalibrating the electromagnetic scanner based at least in part on comparing the one or more peak frequency bands to broadcast frequencies assigned to local radio stations of the geographic location. In one embodiment, the method includes comparing the one or more peak frequency bands to the broadcast frequencies assigned to the local radio stations of the geographic location to find a match; in response to not finding the match between the one or more peak frequency bands and broadcast frequencies, generating a signal indicating that the electromagnetic scanner is not calibrated; and in response to finding the match, generating the signal indicating that the electromagnetic scanner is calibrated. In one embodiment, the recalibrating further includes identifying an error in a first calibration state of the electromagnetic scanner based on a difference between the peak frequency band and the broadcast frequencies assigned to the local radio stations of the geographic location; deriving one or more corrective coefficients to correct the error; and applying the one or more corrective coefficients to cause the electromagnetic scanner to be recalibrated to a second calibration state. In one embodiment, the method includes multiplying output of an oscillator of the electromagnetic scanner by the corrective coefficient to apply the corrective coefficient. In one embodiment, the method includes multiplying a synthesized frequency of the electromagnetic scanner by the corrective coefficient to apply the corrective coefficient.

In one embodiment, a method for self-calibration of an electromagnetic scanner includes detecting a peak frequency band in electromagnetic signals collected by the electromagnetic scanner at a geographic location; identifying an error in a first calibration state of the electromagnetic scanner based on a difference between the peak frequency band and broadcast frequencies assigned to local radio stations of the geographic location; deriving a corrective coefficient to correct the error; and applying the corrective coefficient to collected electromagnetic signals to cause the electromagnetic scanner to be recalibrated to a second calibration state. In one embodiment, the method includes identifying a scalar by which at least the peak frequency band and a second peak frequency band both differ from at least two of the broadcast frequencies; and selecting an inverse of the scalar to be the corrective coefficient.

Figure 12:
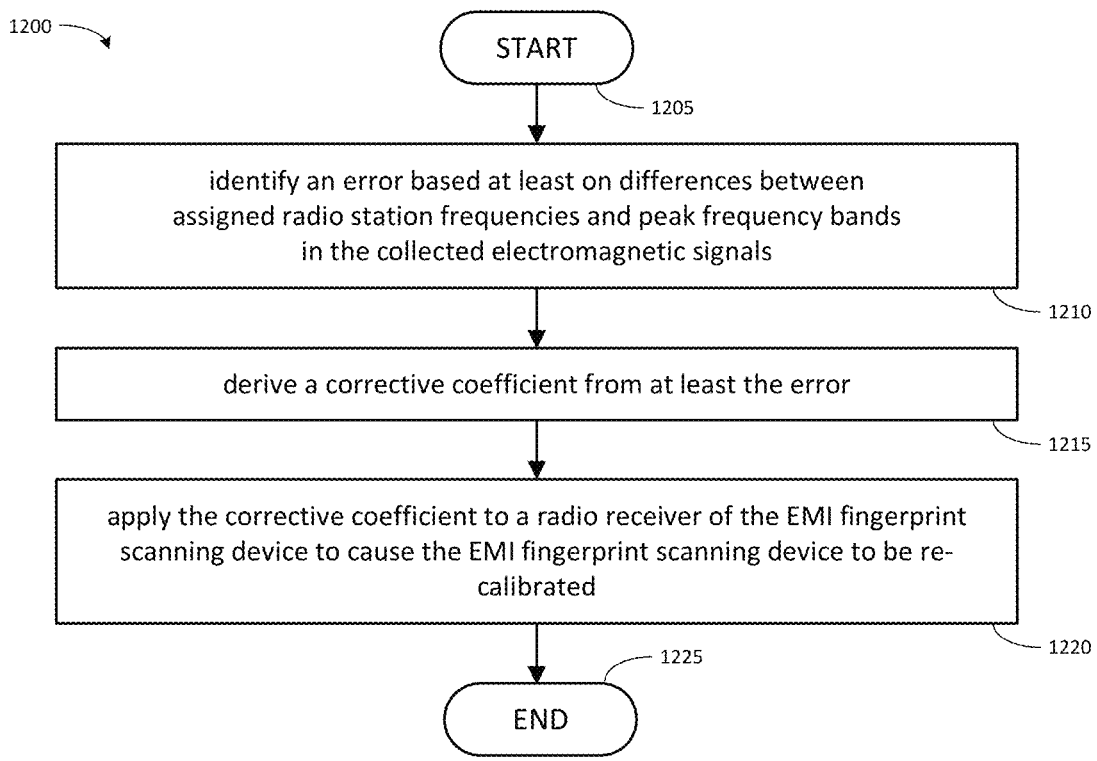
FIG. 12 illustrates one embodiment of a method associated with automated re-calibration of EMI fingerprint scanning instrumentation that is not properly calibrated.

FIG. 12 illustrates one embodiment of a method 1200 associated with automated re-calibration of EMI fingerprint scanning instrumentation that is not properly calibrated. In one embodiment, the steps of method 1200 are performed are performed by EMI fingerprint scanning device 100 in accordance with calibration logic 160. In one embodiment, method 1200 may follow from initiation of a re-calibration process in response to the calibration state signal indicating the EMI fingerprint scanning device is not calibrated, as shown and described with reference to process block 935 of method 900. The method 1200 initiates at START block 1205 in response to parsing a signal received or stored data retrieved that indicates that the method 1200 should begin, for example an indication that a re-calibration process has been initiated. Processing continues to process block 1210.

At process block 1210, the processor identifies an error based at least on differences between one or more of the one or more of the assigned radio station frequencies and one or more of the peak frequency bands in the collected electromagnetic signals.

In one embodiment, the EMI fingerprint scanning device 100 identifies at least two peak frequency bands in the collected electromagnetic signals that differ respectively from at least two of the assigned radio station frequencies at the geographic location by a common scalar error. While the scalar error may be identified from a single pair of peak frequency and assigned station frequency, the presence of the same scalar error (or error coefficient) for two pairs of peak frequency and assigned radio station frequency serves to confirm that the peak frequency is correctly paired with an assigned radio station. This confirms that correct scalar error has been identified. Identifying further peak frequency—assigned radio station frequency pairs with the same scalar error further confirms that the detected peak frequencies have drifted from the frequency of the actual radio station broadcast by the scalar error. In one embodiment, the scalar error (or error coefficient) for a pair of observed peak frequency and assigned radio station frequency may be calculated by taking the difference between the observed peak frequency and the assigned radio station frequency and dividing the difference by the assigned radio station frequency. Note that there may be minor variances between the error coefficients calculated for each pair. Thus, the error coefficients may be considered to be "the same" when they differ only within an acceptable tolerance. In one embodiment, the average of all the error coefficients is determined to be the "actual" value of the error coefficient.

In one embodiment, therefore, the EMI fingerprint scanning device 100 identifies multiple peak frequency bands in the collected electromagnetic signals that differ from the assigned local radio station frequencies by the same coefficient. For example, the EMI fingerprint scanning device 100 identifies the error coefficient between each combination of peak frequency band and assigned radio station frequency. The EMI fingerprint scanning device 100 selects the coefficients of those pairs that have coefficients that differ only within an acceptable tolerance. The EMI fingerprint scanning device 100 takes the average of the selected coefficients and records the average as the value of the scalar error (error coefficient) as a data structure in local data storage 110.

Once the processor has thus completed identifying an error based at least on differences between one or more of the one or more of the assigned radio station frequencies and one or more of the peak frequency bands in the collected electromagnetic signals, processing at process block 1210 completes, and processing continues to process block 1215.

At process block 1215, the processor derives a corrective coefficient from at least the error. In one embodiment, the EMI fingerprint scanning device 100 retrieves the value of the error coefficient from local data storage 100. The EMI fingerprint scanning device 100 takes the inverse (1/N) of the error coefficient to create the corrective coefficient. The EMI fingerprint scanning device 100 stores the value of the corrective coefficient as a data structure in local data storage 110. Once the processor has thus completed deriving a corrective coefficient from at least the error, processing at process block 1215 completes, and processing continues to process block 1220.

At process block 1220, the processor applies the corrective coefficient to the radio receiver to cause the EMI fingerprint scanning device to be re-calibrated.

In one embodiment, the EMI fingerprint scanning device 100 applies the corrective coefficient to an output of a local oscillator 170 of the radio receiver 140 of the EMI fingerprint scanning device 100 to correct the frequencies synthesized by frequency synthesizer 175. Corrected synthesized frequencies will cause observed electromagnetic signals to be associated with (or "seen" at) their correct wavelengths. The EMI fingerprint scanning device 100 is thus re-calibrated. In one embodiment, the EMI fingerprint scanning device 100 retrieves the value of the corrective coefficient from local data storage 110. The EMI fingerprint scanning device 100 multiplies either (i) the local oscillator frequency or (ii) the synthesized frequency by the corrective coefficient to cause the calibration of the EMI fingerprint scanning device 100 to be corrected.

Once the processor has thus completed applying the corrective coefficient to the radio receiver to cause the EMI fingerprint scanning device to be re-calibrated, processing at process block 1220 completes, and processing continues to END block 1225, where method 1200 completes.

In one embodiment, if the re-calibration process still fails to completely correct calibration errors of the EMI fingerprint scanning device 100, the EMI fingerprint scanning device may present a further calibration warning on display 140 indicating that the calibration may not be correctible in the field, and may require equipment servicing or replacement for one or more components of EMI fingerprint scanning device 100.

SELECTED EXAMPLE EMBODIMENTS

In one embodiment, a method for verifying calibration of an electromagnetic scanner includes: detecting one or more peak frequency bands in electromagnetic signals collected by the electromagnetic scanner at a geographic location; comparing the one or more peak frequency bands to carrier or center frequencies assigned to local radio stations of the geographic location; finding at least one match between one peak frequency band of the peak frequency bands and one of the carrier or center frequencies; and verifying that the electromagnetic scanner is calibrated in response to finding the at least one match. In one embodiment, the method also includes: requesting radio station identification information from a frequency data service for carrier or center frequencies at the one or more peak frequency bands; and determining whether a response from the frequency data service includes a radio station near the geographic location that broadcasts on the one of the carrier or center frequencies at the one peak frequency band to find the match. In one embodiment, the method also includes: requesting radio station identification information from a frequency data service for radio stations near the geographic location; and determine whether a response from the frequency data service includes a radio station that broadcasts on the one of the carrier or center frequencies. In one embodiment, the method also includes: requesting radio station identification information from a frequency data service for radio stations near the geographic location that broadcast on carrier or center frequencies at the one or more peak frequency bands; and determine whether a response from the frequency data service includes a radio station to find the match. In one embodiment, the method also includes accepting as the geographic location one of: (i) latitude and longitude coordinates from a global positioning system (GPS) receiver associated with the electromagnetic scanner; and (ii) user input in response to a prompt on a user interface of the electromagnetic scanner to input the geographic location. In one embodiment, the method also includes, in response to the verification that the electromagnetic scanner is calibrated, presenting a calibration verification on a user interface of the scanning device. In one embodiment, the method also includes: performing an EMI fingerprint scan of a target utility device to generate an EMI fingerprint for the target utility device; generating a calibration proof for the EMI fingerprint scan from the collected electromagnetic frequencies, the assigned radio station frequencies, and the calibration state signal; and including the calibration proof with the EMI fingerprint.

In one embodiment, a method for detecting non-calibration of an electromagnetic scanner includes: detecting one or more peak frequency bands in electromagnetic signals collected by the electromagnetic scanner at a geographic location; comparing the one or more peak frequency bands to carrier or center frequencies assigned to local radio stations of the geographic location; finding no match between the peak frequency bands and the carrier or center frequencies; and indicating that the electromagnetic scanner is not calibrated in response to finding no match. In one embodiment, the method also includes: requesting radio station identification information from a frequency data service for carrier or center frequencies at the one or more peak frequency bands; and determining whether a response from the frequency data service does not include a radio station near the geographic location that broadcasts on a carrier or center frequency at any of the peak frequency bands to find the no match. In one embodiment, the method also includes: requesting radio station identification information from a frequency data service for radio stations near the geographic location; and determining whether a response from the frequency data service does not include a radio station that broadcasts on a carrier or center frequencies at any of the peak frequency bands to find the no match. In one embodiment, the method also includes: requesting radio station identification information from a frequency data service for radio stations near the geographic location that broadcast carrier or center frequencies at the one or more peak frequency bands; and determining whether a response from the frequency data service does not include a radio station to find the no match. In one embodiment, the method also includes presenting a prompt on a user interface of the electromagnetic scanner to input the geographic location; and accepting user input in response to the prompt as the geographic location. In one embodiment, the method also includes accepting latitude and longitude coordinates from a global positioning system (GPS) receiver associated with the electromagnetic scanner as the geographic location. In one embodiment, the method also includes, in response to the indication that the electromagnetic scanner is not calibrated, presenting a calibration warning on a user interface of the scanning device.

In one embodiment, a method for self-recalibration of an electromagnetic scanner includes: detecting one or more peak frequency bands in electromagnetic signals collected by the electromagnetic scanner at a geographic location; retrieving carrier or center frequencies assigned to local radio stations of the geographic location; identifying an error based on differences between one of the one or more peak frequency bands and one of the carrier or center frequencies; deriving a corrective coefficient to correct the error; and applying the corrective coefficient to collected electromagnetic signals to cause the electromagnetic scanner to be recalibrated. In one embodiment, the method also includes: identifying a scalar by which at least two of the peak frequency bands both differ from at least two of the center or carrier frequencies; and selecting the inverse of the scalar to be the corrective coefficient. In one embodiment, the method also includes multiplying output of a local oscillator of the electromagnetic scanner by the corrective coefficient to apply the corrective coefficient to collected electromagnetic signals. In one embodiment, the method also includes multiplying a synthesized frequency of the electromagnetic scanner by the corrective coefficient to apply the corrective coefficient to collected electromagnetic signals. In one embodiment, the method also includes: detecting one or more corrected peak frequency bands to which the corrective coefficient has been applied by the recalibrated electromagnetic scanner; comparing the one or more corrected peak frequency bands to carrier or center frequencies assigned to local radio stations of the geographic location; finding at least one match between one corrected peak frequency band of the corrected peak frequency bands and one of the carrier or center frequencies; and verifying that the electromagnetic scanner is calibrated in response to finding the at least one match. In one embodiment, the method also includes accepting latitude and longitude coordinates from a global positioning system (GPS) receiver associated with the electromagnetic scanner as the geographic location.

The foregoing methods, as shown and described herein, may be implemented by special-purpose computer systems or electromagnetic scanning systems, or recorded on a non-transitory computer-readable medium as computer-readable instructions or software modules configured to, when executed by a computer, cause the computer to operate according to the methods shown and described herein.

Selected Advantages

The autonomous EMI fingerprint calibration systems and methods described herein substantially eliminate complexity in procedures for EMI fingerprint counterfeit detection for utility critical assets. The systems and methods described herein make calibration validation unobtrusive, and readily performed by non-expert personnel. The systems and methods described herein eliminate the need for the EMI fingerprint scanning device 100 to be calibrated using a reference source of EMI signals. The systems and methods described herein provide proof or certification of calibration needed to support determinations by the EMI fingerprint scanning device that a target utility device is genuine or contains one or more counterfeit components. The systems and methods described herein enable non-expert personnel to identify and correct for calibration drift of the EMI fingerprint scanning device 100, increasing accuracy of EMI fingerprint scans performed by the device. Other advantages enabled by the systems and methods are described elsewhere herein. Each of these advantages demonstrate an improvement to EMI fingerprinting technology, to electromagnetic scanning device calibration technology, or to other technological fields. Thus, the systems and methods described herein are practically applied to effect improved operations.

Software Module Embodiments

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing specific tasks, processes, functions, or operations. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

Computing Device Embodiment

Figure 13:
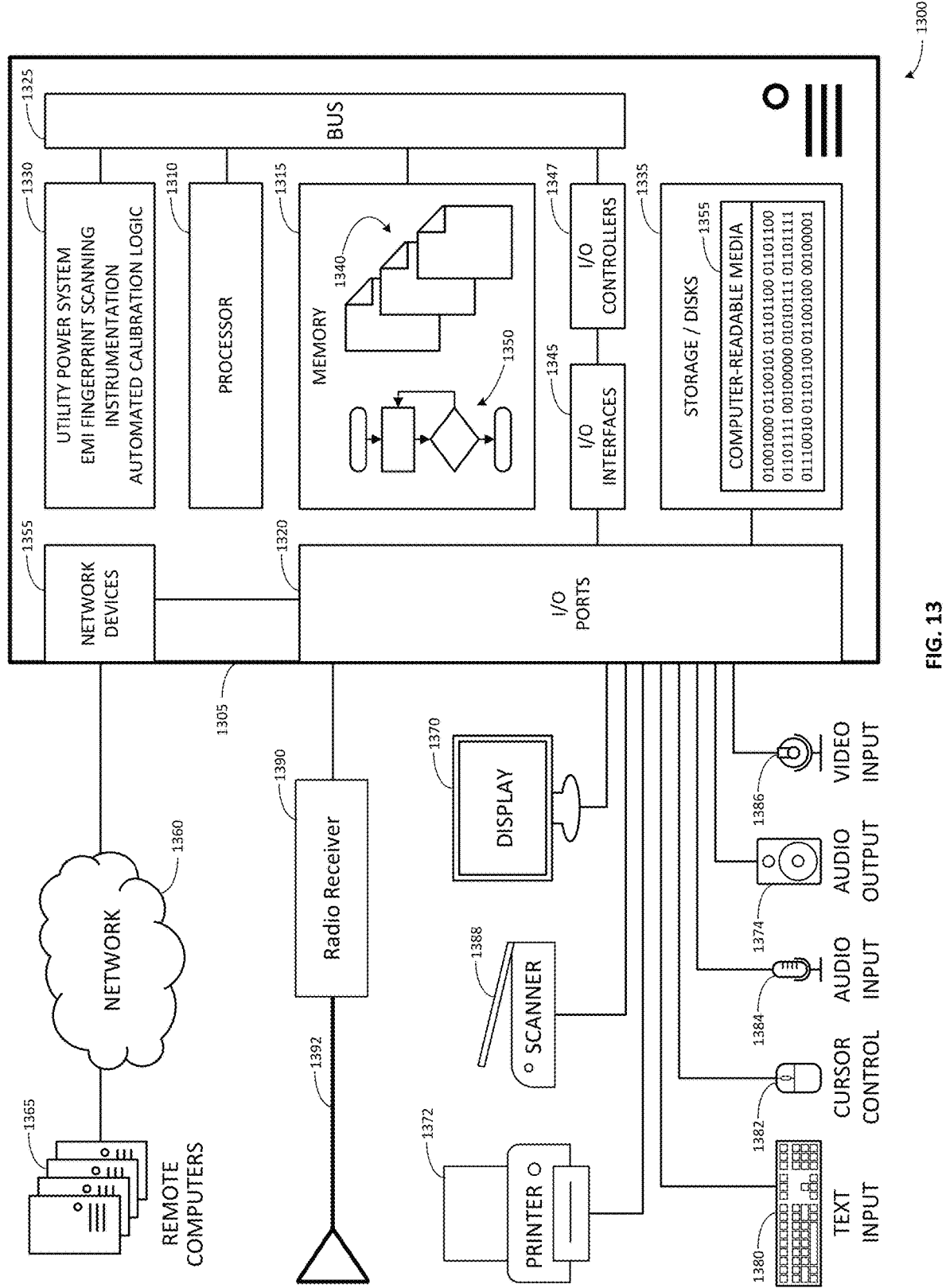
FIG. 13 illustrates an embodiment of a computing device configured and/or programmed with one or more of the example systems, methods, and/or special purpose equipment disclosed herein, and/or equivalents.

FIG. 13 illustrates an embodiment of a computing device 1300 configured and/or programmed with one or more of the example systems, methods, and/or special purpose equipment disclosed herein, and/or equivalents. The example computing device 1300 may be a computer 1305 that includes a processor 1310, a memory 1315, and input/output ports 1320 operably connected by a bus 1325. In one example, the computer 1305 may include utility power system EMI fingerprint scanning instrumentation automated calibration logic 1330 configured to facilitate automated calibration of EMI fingerprint scanning instrumentation for utility power system counterfeit detection, similar to logic and systems shown in FIGS. 1 through 12. In different examples, the logic 1330 may be implemented in hardware, a non-transitory computer-readable medium with stored instructions, firmware, and/or combinations thereof. While the logic 1330 is illustrated as a hardware component attached to the bus 1325, it is to be appreciated that in other embodiments, the logic 1330 could be implemented in the processor 1310, stored in memory 1315, or stored in disk 1335.

In one embodiment, logic 1330 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed for high-sensitivity detection and identification of counterfeit components in utility power systems using EMI frequency kiviat tubes. The means may also be implemented as stored computer executable instructions that are presented to computer 1305 as data 1340 that are temporarily stored in memory 1315 and then executed by processor 1310.

Logic 1330 may also provide means (e.g., hardware, non-transitory computer-readable medium that stores executable instructions, firmware) for performing high-sensitivity detection and identification of counterfeit components in utility power systems using EMI frequency kiviat tubes.

Generally describing an example configuration of the computer 1305, the processor 1310 may be a variety of various processors including dual microprocessor and other multi-processor architectures. A memory 1315 may include volatile memory and/or non-volatile memory. Non-volatile memory may include, for example, ROM, PROM, and so on. Volatile memory may include, for example, RAM, SRAM, DRAM, and so on.

A storage disk 1335 may be operably connected to the computer 1300 via, for example, an input/output (I/O) interface (for example, card, device) 1345 and an input/output port 1320. The disk 1335 may be, for example, a magnetic disk drive, a solid-state disk drive, a floppy disk drive, a tape drive, a Zip drive, a flash memory card, a memory stick, and so on. Furthermore, the disk 1335 may be a CD-ROM drive, a CD-R drive, a CD-RW drive, a DVD ROM, and so on. The memory 1315 can store a process 1350 and/or a data 1340, for example. The disk 1335 and/or the memory 1315 can store an operating system that controls and allocates resources of the computer 1305.

The computer 1305 may interact with input/output (I/O) devices via the I/O interfaces 1345 and the input/output ports 1320. Input/output devices may be, for example, a keyboard 1380, a microphone 1384, a pointing and selection device 1382, cameras 1386, video cards, displays 1370, scanners 1388, printers 1372, speakers 1374, the disk 1335, the network devices 1355, and so on. The input/output ports 1320 may include, for example, serial ports, parallel ports, and USB ports. The input/output devices may include a broad spectrum (or other spectrum) radio receiver 1390 and associated antenna 1392.

The computer 1305 can operate in a network environment and thus may be connected to the network devices 1355 via the I/O interfaces 1345, and/or the I/O ports 1320. Through the network devices 1355, the computer 1305 may interact with a network 1360. Through the network 1360, the computer 1305 may be logically connected to remote computers 1365. Networks with which the computer 1305 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A method for verifying calibration of an electromagnetic scanner, the method comprising:
   detecting one or more peak frequency bands in electromagnetic signals collected by the electromagnetic scanner at a geographic location;
   comparing the one or more peak frequency bands to broadcast frequencies assigned to local radio stations of the geographic location; and
   indicating that the electromagnetic scanner is calibrated by finding at least one match between one peak frequency band of the one or more peak frequency bands and one of the broadcast frequencies.

2. The method of claim 1, further comprising:
   requesting radio station identification information from a frequency data service for broadcast frequencies at the one or more peak frequency bands; and
   determining whether a response from the frequency data service includes a radio station near the geographic location that broadcasts on the one of the broadcast frequencies at the one peak frequency band to find the match.

3. The method of claim 1, further comprising:
   requesting radio station identification information from a frequency data service for radio stations near the geographic location; and
   determining whether a response from the frequency data service includes a radio station that broadcasts on the one of the broadcast frequencies.

4. The method of claim 1, further comprising:
   requesting radio station identification information from a frequency data service for radio stations near the geographic location that broadcast on broadcast frequencies at the one or more peak frequency bands; and
   determining whether a response from the frequency data service includes a radio station to find the match.

5. The method of claim 1, further comprising accepting as the geographic location one of:
   latitude and longitude coordinates from a global positioning system (GPS) receiver associated with the electromagnetic scanner; and
   user input in response to a prompt on a user interface of the electromagnetic scanner to input the geographic location.

6. The method of claim 1, further comprising, in response to verification that the electromagnetic scanner is calibrated, presenting a calibration verification on a user interface of the electromagnetic scanner.

7. The method of claim 1, further comprising:
   performing an EMI fingerprint scan of a target utility device to generate an EMI fingerprint for the target utility device;
   generating a calibration proof for the EMI fingerprint scan from the collected electromagnetic signals, the broadcast frequencies assigned to the local radio stations, and a calibration state signal; and
   including the calibration proof with the EMI fingerprint.

8. A method for recalibrating an electromagnetic scanner, the method comprising:
   detecting one or more peak frequency bands in electromagnetic signals collected by the electromagnetic scanner at a geographic location; and
   recalibrating the electromagnetic scanner based at least in part on comparing the one or more peak frequency bands to broadcast frequencies assigned to local radio stations of the geographic location.

9. The method of claim 8, further comprising:
   comparing the one or more peak frequency bands to the broadcast frequencies assigned to the local radio stations of the geographic location to find a match;
   in response to not finding the match between the one or more peak frequency bands and the broadcast frequencies, generating a signal indicating that the electromagnetic scanner is not calibrated; and
   in response to finding the match, generating the signal indicating that the electromagnetic scanner is calibrated.

10. The method of claim 8, wherein the recalibrating further comprises:
    identifying an error in a first calibration state of the electromagnetic scanner based on a difference between the one or more peak frequency bands and the broadcast frequencies assigned to the local radio stations of the geographic location;
    deriving one or more corrective coefficients to correct the error; and
    applying the one or more corrective coefficients to cause the electromagnetic scanner to be recalibrated to a second calibration state.

11. The method of claim 8, further comprising multiplying output of an oscillator of the electromagnetic scanner by a corrective coefficient to apply the corrective coefficient.

12. The method of claim 8, further comprising multiplying a synthesized frequency of the electromagnetic scanner by a corrective coefficient to apply the corrective coefficient.

13. The method of claim 8, further comprising:
    presenting a prompt on a user interface of the electromagnetic scanner to input the geographic location; and
    accepting user input in response to the prompt as the geographic location.

14. The method of claim 8, further comprising accepting latitude and longitude coordinates from a global positioning system (GPS) receiver associated with the electromagnetic scanner as the geographic location.

15. A method for self-calibration of an electromagnetic scanner, the method comprising:
    detecting a peak frequency band in electromagnetic signals collected by the electromagnetic scanner at a geographic location;
    identifying an error in a first calibration state of the electromagnetic scanner based on a difference between the peak frequency band and broadcast frequencies assigned to local radio stations of the geographic location;
    deriving a corrective coefficient to correct the error; and
    applying the corrective coefficient to collected electromagnetic signals to cause the electromagnetic scanner to be recalibrated to a second calibration state.

16. The method of claim 15, further comprising:
    identifying a scalar by which at least the peak frequency band and a second peak frequency band both differ from at least two of the broadcast frequencies; and
    selecting an inverse of the scalar to be the corrective coefficient.

17. The method of claim 15, further comprising multiplying output of a local oscillator of the electromagnetic scanner by the corrective coefficient to apply the corrective coefficient to the collected electromagnetic signals.

18. The method of claim 15, further comprising multiplying a synthesized frequency of the electromagnetic scanner by the corrective coefficient to apply the corrective coefficient to the collected electromagnetic signals.

19. The method of claim 15, further comprising:
- detecting one or more corrected peak frequency bands to which the corrective coefficient has been applied by the recalibrated electromagnetic scanner;
- comparing the one or more corrected peak frequency bands to the broadcast frequencies assigned to the local radio stations of the geographic location;
- finding at least one match between one corrected peak frequency band of the corrected peak frequency bands and one of the broadcast frequencies; and
- verifying that the electromagnetic scanner is calibrated in response to finding the at least one match.

20. The method of claim 15, further comprising accepting latitude and longitude coordinates from a global positioning system (GPS) receiver associated with the electromagnetic scanner as the geographic location.

* * * * *

UNITED STATES PATENT AND TRADEMARK OFFICE
CERTIFICATE OF CORRECTION

| | | |
|---|---|---|
| PATENT NO. | : 11,726,160 B2 | Page 1 of 1 |
| APPLICATION NO. | : 17/694304 | |
| DATED | : August 15, 2023 | |
| INVENTOR(S) | : Wetherbee et al. | |

It is certified that error appears in the above-identified patent and that said Letters Patent is hereby corrected as shown below:

In the Specification

In Column 13, Line 11, delete "that that" and insert -- that --, therefor.

In Column 18, Line 23, delete "station. In" and insert -- station, in --, therefor.

In Column 18, Line 24, delete "ment, the" and insert -- ment. --, therefor.

In Column 22, Line 23, delete "FIG. 700." and insert -- FIG. 7 --, therefor.

In Column 30, Line 52, delete "on)" and insert -- on. --, therefor.

In Column 31, Line 8, delete "U.S.C" and insert -- U.S.C. --, therefor.

In Column 32, Line 7, delete "U.S.C" and insert -- U.S.C. --, therefor.

Signed and Sealed this
Third Day of September, 2024

Katherine Kelly Vidal
*Director of the United States Patent and Trademark Office*